(12) United States Patent
Garcia-Dorado et al.

(10) Patent No.: US 11,880,902 B2
(45) Date of Patent: Jan. 23, 2024

(54) SYSTEMS, APPARATUS, AND METHODS FOR ENHANCED IMAGE CAPTURE

(71) Applicant: Waymo LLC, Mountain View, CA (US)

(72) Inventors: Ignacio Garcia-Dorado, Mountain View, CA (US); Damien Kelly, Mountain View, CA (US); Xiaoying He, Mountain View, CA (US); Jia Feng, Mountain View, CA (US); Bartlomiej Wronski, Mountain View, CA (US); Peyman Milanfar, Mountain View, CA (US); Lucian Ion, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 301 days.

(21) Appl. No.: 17/138,229

(22) Filed: Dec. 30, 2020

(65) Prior Publication Data

US 2022/0207652 A1  Jun. 30, 2022

(51) Int. Cl.
*G06K 9/00* (2022.01)
*G06T 3/40* (2006.01)
(Continued)

(52) U.S. Cl.
CPC ............ *G06T 3/4053* (2013.01); *B60R 11/04* (2013.01); *G06F 17/16* (2013.01); *G06F 17/18* (2013.01)

(58) Field of Classification Search
CPC ....... G06T 3/4053; B60R 11/04; G06F 17/16; G06F 17/18
See application file for complete search history.

(56) References Cited

U.S. PATENT DOCUMENTS 7,602,997 B2 * 10/2009 Young .................. G06T 3/4069
382/280
7,940,282 B2  5/2011 Milanfar et al.
(Continued)

FOREIGN PATENT DOCUMENTS

| WO | 2020033427 A | 2/2020 | |
| WO | 2020033432 A1 | 2/2020 | |
| WO | WO-2020033432 A1 * | 2/2020 | ............. G06N 7/005 |

OTHER PUBLICATIONS

Wronski, Bartlomiej, et al. "Handheld multi-frame super-resolution." ACM Transactions on Graphics (TOG) 38.4 (2019): 1-18. (Year: 2019).*

(Continued)

*Primary Examiner* — Avinash Yentrapati
(74) *Attorney, Agent, or Firm* — McDonnell Boehnen Hulbert & Berghoff LLP

(57) ABSTRACT

Described examples relate to an apparatus comprising one or more image sensors coupled to a vehicle and at least one processor. The at least one processor may be configured to capture, in a burst sequence using the one or more image sensors, multiple frames of an image of a scene, the multiple frames having respective, relative offsets of the image across the multiple frames and perform super-resolution computations using the captured, multiple frames of the image of the scene. The at least one processor may also be configured to accumulate, based on the super-resolution computations, color planes and combine, using the one or more processors, the accumulated color planes to create a super-resolution image of the scene.

20 Claims, 12 Drawing Sheets

(51) Int. Cl.
*G06F 17/16* (2006.01)
*G06F 17/18* (2006.01)
*B60R 11/04* (2006.01)

(56) References Cited

U.S. PATENT DOCUMENTS

| | | | |
|---|---|---|---|
| 9,087,391 B2 | 7/2015 | Geiss et al. | |
| 9,106,784 B2* | 8/2015 | Lelescu | H04N 23/45 |
| 9,497,440 B2* | 11/2016 | Bamji | H04N 13/204 |
| 9,813,616 B2* | 11/2017 | Lelescu | G06T 11/60 |
| 10,222,211 B2* | 3/2019 | Chen | G05D 1/0088 |
| 2004/0008262 A1* | 1/2004 | Silverbrook | H04N 1/0044 |
| | | | 348/222.1 |
| 2011/0150331 A1* | 6/2011 | Young | G06T 3/4069 |
| | | | 382/167 |
| 2012/0224766 A1 | 9/2012 | Ohki et al. | |
| 2013/0242129 A1 | 9/2013 | Harmeling et al. | |
| 2015/0169990 A1* | 6/2015 | McLaughlin | G06T 3/4069 |
| | | | 382/218 |
| 2019/0068962 A1* | 2/2019 | Van Schoyck | G06T 7/0002 |
| 2019/0208136 A1* | 7/2019 | Wendel | H04N 5/917 |
| 2019/0391587 A1* | 12/2019 | Uvarov | G06V 10/82 |
| 2021/0215504 A1* | 7/2021 | Zhang | G01C 21/3815 |
| 2021/0280059 A1* | 9/2021 | Fiszer | G08G 1/096741 |
| 2021/0368109 A1* | 11/2021 | Wendel | H04N 23/951 |
| 2022/0178690 A1* | 6/2022 | Wallace | G01C 15/00 |

OTHER PUBLICATIONS

Jian, Shang-Chi, Guangyang Pan, and Tsorng-Lin Chia. "Generating the Super-resolution Image for the Video from the In-vehicle Data Recorder." Proceedings of the 2019 4th International Conference on Robotics, Control and Automation. 2019. (Year: 2019).*
Ben-Ezra, Moshe, Assaf Zomet, and Shree K. Nayar. "Video super-resolution using controlled subpixel detector shifts." IEEE transactions on pattern analysis and machine intelligence 27.6 (2005): 977-987. (Year: 2005).*
Del Gallego et al., "Multiple-image super-resolution on mobile devices: an image warping approach", EURASIP Journal on Image and Video Processing, Article No. 8, Jan. 19, 2017.
Wronski et al., "Handheld Multi-Frame Super-Resolution", ACM Transactions on Graphics (TOG), vol. 38, No. 4, pp. 1-18, Jul. 2019.
Hasinoff et al., "Burst photography for high dynamic range and low-light imaging on mobile cameras", ACM Transactions on Graphics (TOG), vol. 35, No. 6, pp. 1-12, Dec. 5-8, 2016.
Aboussou, "Super-Resolution Image Construction Using an Array Camera", Technical Disclosure Commons, Defensive Publications Series, Art. 643, Aug. 18, 2017.
International Search Report and Written Opinion from International Application No. PCT/US2021/062417, dated Mar. 28, 2022.

* cited by examiner

610

Multiple frames having sub-pixel offsets
602

SYSTEMS, APPARATUS, AND METHODS FOR ENHANCED IMAGE CAPTURE

BACKGROUND

Autonomous vehicles may use various computing systems to aid in the transport of passengers from one location to another. Some autonomous vehicles may operate based on some initial input or continuous input from an operator, such as a pilot, driver, or passenger. Other systems, such as autopilot systems, may be used only when the system has been engaged, which permits the operator to switch from a manual mode (where the operator may exercise a high degree of control over the movement of the vehicle) to an autonomous mode (where the vehicle essentially drives itself) to modes that lie somewhere in between.

Such autonomous vehicles are typically equipped with various types of sensors. For example, an autonomous vehicle may include lidars, radars, cameras, and/or other devices which scan and record data from the surroundings of the vehicle. The data from one or more of these devices may be used to detect characteristics of a scene. For example, images captured by a camera may be used to obtain information about a scene.

In order to convey the scene as a color image, a camera may include a color filter array (CFA), which usually requires the camera to perform demosaicing techniques while rendering a captured image of the scene. However, such demosaicing techniques may be detrimental to super-resolution rendering. For example, effects of demosaicing techniques can include chromatic aliasing, false gradients, and Moiré patterns that may lead to rendering the captured image of the scene at a poor resolution and with non-desirable artifacts.

SUMMARY

The present disclosure describes systems, apparatus, and methods that improve the functioning of a computing system of an autonomous vehicle by enabling the creation of enhanced images of a scene. The computing system receives images of an environment surrounding a vehicle from an image capture device and creates super-resolution and/or denoised images of a scene of the environment. The computing system offers advantages over other computing systems of autonomous vehicles that rely on demosaicing, providing the enhanced images of the scene without detrimental artifacts, such as chromatic aliasing, false gradients, and Moiré patterns. Further, the computing device may be configured to produce real-time super-resolution and/or denoised images of a scene with low latency.

In one aspect, a method for creating an enhanced image of a scene is described. The method includes capturing, by an image capture device coupled to a vehicle, multiple frames of an image of a scene in a burst sequence, where the multiple frames have respective, relative sub-pixel offsets of the image due to motion of the image capture device during the burst sequence. The method also includes performing super-resolution computations using the captured multiple frames and creating, based on the super-resolution computations, a super-resolution image of the scene.

In another aspect, the present application describes an apparatus comprising one or more image sensors and at least one processor. The at least one processor may be configured to capture, in a burst sequence using the one or more image sensors, multiple frames of an image of a scene, the multiple frames having respective, relative offsets of the image across the multiple frames. The at least one processor may also perform super-resolution computations using the captured, multiple frames of the image of the scene. Further, the at least one processor may be configured to accumulate, based on the super-resolution computations, color planes and combine, using the one or more processors, the accumulated color planes to create a super-resolution image of the scene.

In still another aspect, a non-transitory computer-readable medium storing instructions is disclosed that, when the instructions are executed by one or more processors, causes the one or more processors to perform operations. The operations may include capturing, by an image capture device coupled to a vehicle, multiple frames of an image of a scene in a burst sequence, where the multiple frames have respective, relative sub-pixel offsets of the image due to motion of the image capture device during the burst sequence. The operations may also include performing super-resolution computations using the captured multiple frames and creating, based on the super-resolution computations, a super-resolution image of the scene.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Figure 1:
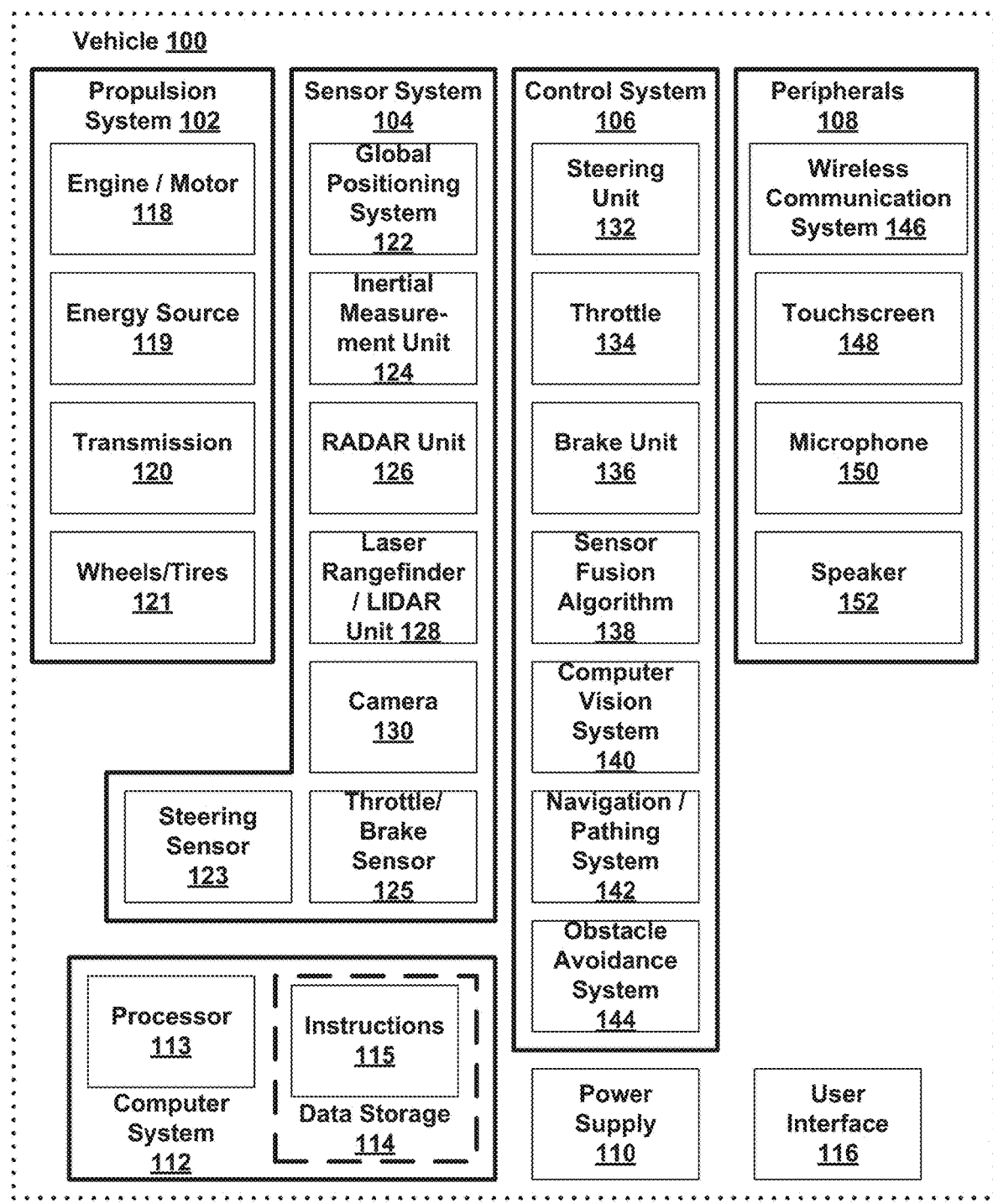
FIG. 1 is a functional block diagram illustrating systems of a vehicle, according to an example implementation.

Example systems, apparatus, and methods for creating enhanced images are described herein. It should be understood that the words "example," "exemplary," and "illustrative" are used herein to mean "serving as an example, instance, or illustration." Any implementation or feature described herein as being an "example," "exemplary," and/or "illustrative" is not necessarily to be construed as preferred or advantageous over other implementations or features. Thus, other embodiments can be utilized and other changes can be made without departing from the scope of the subject matter presented herein.

Accordingly, the example embodiments and implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

The present disclosure provides systems, apparatus, and methods that improve the functioning of a computing system of an autonomous vehicle by enabling the creation of enhanced images. The computing system receives images of an environment surrounding a vehicle and creates super-resolution and/or denoised images of a scene of the environment. The images may be captured by an image capture device during movement of the image capture device. The movement of the image capture device may result in the capture of multiple image frames that have subpixel offsets of the image of the scene across the multiple image frames. The computing device may perform super-resolution computations, based on the sub-pixel offsets of the image of the scene, and may create enhanced images (e.g., super-resolution and/or denoised images) of the scene based on the super-resolution computations. The computing device may generate the enhanced images of the scene without detrimental artifacts, such as chromatic aliasing, false gradients, and Moiré patterns. By creating the enhanced images, the computing device may increase the signal-to-noise ratio (SNR) of the multiple image frames of the scene.

The computing device may be capable of producing real-time super-resolution and/or denoised images of a scene with low latency. The computing device may use the super-resolution and denoised images of the scene to improve the ability of the computing device to detect objects in the scene. For example, the computing device may detect objects in the scene more quickly and may detect objects more easily in low light conditions. The computing device may also use the super-resolution and denoised images to increase the reliability of object detection and to more accurately classify objects (e.g., distinguishing between a person walking and a person running, distinguishing between a motorcycle and a car, determining the illuminated color of a traffic light, etc.). Further, the computing device may use the super-resolution images to optically enlarge images of a scene. For example, the super-resolution and denoised images may achieve about a 1.6-2.0 times optical zoom of the scene.

An autonomous vehicle may navigate a path of travel without a driver providing guidance and control. In order to obey traffic regulations and avoid obstacles in the environment, the vehicle may utilize data provided by a vehicle sensor system equipped with one or multiple types of sensors. For example, the sensors may include light detection and ranging (lidar) sensors, radio detection and ranging (radar) sensors, sound navigation and ranging (sonar) sensors, image capture devices (e.g., cameras), microphone sensors, and other suitable sensors.

As the vehicle navigates, the sensors of the vehicle sensor system may be configured to capture sensor information (e.g., measurements) indicative of the vehicle's environment and provide the sensor information periodically or in a continuous manner to a computing device of the vehicle sensor system. The sensors may provide the sensor information in various formats to the computing device. For example, the computing device may receive the sensor information in the form of sensor data frames. Each of the sensor data frames may include one or multiple measurements of the environment captured at particular times during the operation of the sensors. Further, the sensors may provide multiple sensor data frames (e.g., a sequence or series of sensor frames) to the computing device as the vehicle operates, which may reflect changes in the environment.

The sensor system of the vehicle may include an image capture device (e.g., an image sensor or camera) configured to capture a sequence of image frames (e.g., images) of a scene. The image capture device may include a plurality of pixel elements configured in horizontal rows and/or vertical columns. The pixel elements of the image capture device may be sampled to obtain pixel values or image data for constructing an image frame (e.g., image). In some examples, the image capture device may have a rolling shutter configured to iteratively sample or scan the vertical columns and/or horizontal rows of the pixel elements. Once the image capture device captures the image data from the pixel elements, the image data may be stored in a memory. The number of image frames captured by the image capture device and the arrangement of the exposure times used to capture the image frames may be referred to as a payload burst or a burst sequence.

In some examples, the image capture device may capture, in a burst sequence, multiple image frames of an image of a scene. The multiple image frames may have sub-pixel offsets that are a result of motion or movement of the image capture device during the burst sequence. The motion of the image capture device may correspond to movement or displacement of the image capture device while the image capture device is capturing the image data. For example, the motion of the image-capture device may correspond to the motion of the vehicle carrying the image capture device as the vehicle moves along a path in the environment. In some instances, and as an alternative to the sub-pixel offsets resulting from the vehicle movement, the sub-pixel offsets may result from another motion applied to the image capture device, such as a haptic motion induced by a vibrating mechanism that is in contact with (or integrated with) the image capture device. Furthermore, and in some instances, the motion of the image-capture device may correspond to a displacement induced by a component or system of the vehicle. For example, the movement or displacement (e.g., motion) of the image capture device may be induced or caused by the vibration of the vehicle's engine, the vehicle's suspension, a multimedia system (e.g., a subwoofer) or the like. Such movement or displacement may result in the capture of multiple image frames of the image of the scene that have respective, sub-pixel offsets of the image across the multiple image frames.

Further, the computing device may detect a motion condition of the image capture device. Based on the detected motion condition, motion may be introduced to cause displacement or movement of the image capture device. In an instance where the detected motion condition is a static motion condition, motion may be introduced to cause movement of the image capture device. In some examples, unsynchronized or synchronized motion may be introduced to induce movement of the image capture device. Due to the movement induced to the image capture device, the image captured device may capture multiple variations of the image of the scene. The multiple variations correspond to multiple image frames of the image of the scene that have respective, sub-pixel offsets of the image across the multiple image frames.

The computing device of the sensor system may be configured to receive the multiple image frames and may perform super-resolution computations. The super-resolution computations may use the variations of the image of the scene (e.g., the multiple image frames of the image of the scene that have respective, sub-pixel offsets of the image across the multiple frames) to create the super-resolution images of the scene. The super-resolution computations are effective to estimate, for each of the multiple image frames, the contribution of pixels to color channels associated with respective color planes. In some implementations, the super-resolution computations may include, for example, Gaussian radial basis function (RBF) computations combined with robustness model computations to create the super-resolution image of the scene.

To perform the Gaussian RBF computations, the computing device may filter pixel signals from each image frame of the multiple image frames to generate respective color-specific image planes corresponding to color channels. The computing device may then align the respective color-specific image planes to a selected reference frame. In addition to corresponding red, green, and blue color channels, the color-specific image planes may also correspond to chromatic color channels (e.g., shades of black, white, and grey) or other color-channels such as cyan, violet, and so on. The Gaussian RBF computations may also include computing a kernel covariance matrix based on analyzing local gradient structure tensors generated by aligning the color-specific image planes to the reference frame. In such instances, the local gradient structure tensors may correspond to edges, corners, or textured areas of content included in the reference frame.

The computing device may compute the robustness model using a statistical neighborhood model that includes color mean and spatial standard deviation computations. The robustness model computations, in some instances, may include denoising computations to compensate for color differences. Further, the computing device may be configured to accumulate color planes based on the super-resolution computations. Accumulating the color plane may include performing computations that, for each color channel, normalize pixel contributions (e.g., normalize contributions of each pixel, of the multiple frames, to each color channel).

In some examples, pixel data (e.g., image data) of the image frames (e.g., images) of the sequence of image frames may be combined by the computing device into an output or composite image frame (e.g., a merged frame). For example, the computing device may combine or merge two or more image frames of the sequence of image frames into a single output image frame. In one example, the computing device may combine the accumulated color planes to create a super-resolution image of the scene. The computing device may send the super-resolution image of the scene to a system of the vehicle or to a display device to render the super-resolution image of the scene. The computing device may use the output image frame to make determinations about the location and identity of objects in the surrounding environment.

Example systems, apparatus, and methods that implement the techniques described herein will now be described in greater detail with reference to the figures. Generally, an example system may be implemented in or may take the form of a sensor or computer system of an automobile. However, a system may also be implemented in or take the form of other systems for vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well.

Referring now to the figures, FIG. 1 is a functional block diagram illustrating systems of an example vehicle 100, which may be configured to operate fully or partially in an autonomous mode. More specifically, the vehicle 100 may operate in an autonomous mode without human interaction through receiving control instructions from a computing system. As part of operating in the autonomous mode, the vehicle 100 may use one or more sensors to detect and possibly identify objects of the surrounding environment to enable safe navigation. In some implementations, the vehicle 100 may also include subsystems that enable a driver to control operations of the vehicle 100.

As shown in FIG. 1, the vehicle 100 may include various subsystems, such as a propulsion system 102, a sensor system 104, a control system 106, one or more peripherals 108, a power supply 110, a computer or computing system 112, a data storage 114, and a user interface 116. In other examples, the vehicle 100 may include more or fewer subsystems, which can each include multiple elements. The subsystems and components of the vehicle 100 may be interconnected in various ways. In addition, functions of the vehicle 100 described herein can be divided into additional functional or physical components, or combined into fewer functional or physical components within implementations. For instance, the control system 106 and computer system 112 may be combined into a single system that operates the vehicle 100 in accordance with various operations.

The propulsion system 102 may include one or more components operable to provide powered motion for the vehicle 100 and can include an engine/motor 118, an energy source 119, a transmission 120, and wheels/tires 121, among other possible components. For example, the engine/motor 118 may be configured to convert the energy source 119 into mechanical energy and can correspond to one or a combination of an internal combustion engine, an electric motor, steam engine, or Stirling engine, among other possible options. For instance, in some implementations, the propulsion system 102 may include multiple types of engines and/or motors, such as a gasoline engine and an electric motor.

The energy source 119 represents a source of energy that may, in full or in part, power one or more systems of the vehicle 100 (e.g., an engine/motor 118). For instance, the energy source 119 can correspond to gasoline, diesel, other petroleum-based fuels, propane, other compressed gas-based fuels, ethanol, solar panels, batteries, and/or other sources of electrical power. In some implementations, the energy source 119 may include a combination of fuel tanks, batteries, capacitors, and/or flywheels.

The transmission 120 may transmit mechanical power from the engine/motor 118 to the wheels/tires 121 and/or other possible systems of the vehicle 100. As such, the transmission 120 may include a gearbox, a clutch, a differential, and a drive shaft, among other possible components. A drive shaft may include axles that connect to one or more of the wheels/tires 121.

The wheels/tires 121 of the vehicle 100 may have various configurations within example implementations. For instance, the vehicle 100 may exist in a unicycle, bicycle/motorcycle, tricycle, or car/truck four-wheel format, among other possible configurations. As such, the wheels/tires 121 may connect to the vehicle 100 in various ways and can exist in different materials, such as metal and rubber.

The sensor system 104 can include various types of sensors or sensor devices, such as a Global Positioning System (GPS) 122, an inertial measurement unit (IMU) 124, a radar 126, a laser rangefinder/lidar sensor 128, a camera 130, a steering sensor 123, and a throttle/brake sensor 125, among other possible sensors. In some implementations, the sensor system 104 may also include sensors configured to monitor internal systems of the vehicle 100 (e.g., $O_2$ monitor, fuel gauge, engine oil temperature, brake wear).

The GPS 122 may include a transceiver operable to provide information regarding the position of vehicle 100 with respect to the Earth. The IMU 124 may have a configuration that uses one or more accelerometers and/or gyroscopes and may sense position and orientation changes of vehicle 100 based on inertial acceleration. For example, the IMU 124 may detect a pitch and yaw of the vehicle 100 while the vehicle 100 is stationary or in motion.

The radar 126 may represent one or more systems configured to use radio signals to sense objects, including the speed and heading of the objects, within the local environment of the vehicle 100. As such, the radar 126 may include antennas configured to transmit and receive radio signals. In some implementations, the radar 126 may correspond to a mountable radar unit or system configured to obtain measurements of the surrounding environment of the vehicle 100.

The laser rangefinder/lidar 128 may include one or more laser sources, a laser scanner, and one or more detectors or sensors, among other system components, and may operate in a coherent mode (e.g., using heterodyne detection) or in an incoherent detection mode. In some embodiments, the one or more detectors or sensor of the laser rangefinder/lidar 128 may include one or more photodetectors. In some examples, the photodetectors may be capable of detecting single photon avalanche diodes (SPAD). Further, such photodetectors can be arranged (e.g., through an electrical connection in series) into an array (e.g., as in a silicon photomultiplier (SiPM)).

The camera 130 may include one or more devices (e.g., a still camera or video camera) configured to capture images of the environment of the vehicle 100. In some examples, the camera may include an image sensor configured to capture a series of images (e.g., image frames) in a time-sequential manner. The image sensor may capture images at a particular rate or at a particular time interval between successive frame exposures.

The steering sensor 123 may sense a steering angle of the vehicle 100, which may involve measuring an angle of the steering wheel or measuring an electrical signal representative of the angle of the steering wheel. In some implementations, the steering sensor 123 may measure an angle of the wheels of the vehicle 100, such as detecting an angle of the wheels with respect to a forward axis of the vehicle 100. The steering sensor 123 may also be configured to measure a combination (or a subset) of the angle of the steering wheel, electrical signal representing the angle of the steering wheel, and the angle of the wheels of the vehicle 100.

The throttle/brake sensor 125 may detect the position of either the throttle position or brake position of the vehicle 100. For instance, the throttle/brake sensor 125 may measure the angle of both the gas pedal (throttle) and brake pedal or may measure an electrical signal that could represent, for instance, an angle of a gas pedal (throttle) and/or an angle of a brake pedal. The throttle/brake sensor 125 may also measure an angle of a throttle body of the vehicle 100, which may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of the vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of the vehicle 100. In other implementations, the throttle/brake sensor 125 may be configured to measure a pressure applied to a pedal of the vehicle, such as a throttle or brake pedal.

The control system 106 may include components configured to assist in navigating the vehicle 100, such as a steering unit 132, a throttle 134, a brake unit 136, a sensor fusion algorithm 138, a computer vision system 140, a navigation/pathing system 142, and an obstacle avoidance system 144. More specifically, the steering unit 132 may be operable to adjust the heading of the vehicle 100, and the throttle 134 may control the operating speed of the engine/motor 118 to control the acceleration of the vehicle 100. The brake unit 136 may decelerate vehicle 100, which may involve using friction to decelerate the wheels/tires 121. In some implementations, brake unit 136 may convert kinetic energy of the wheels/tires 121 to electric current for subsequent use by a system or systems of the vehicle 100.

The sensor fusion algorithm 138 of the control system 106 may include a Kalman filter, Bayesian network, or other algorithms that can process data from the sensor system 104. In some implementations, the sensor fusion algorithm 138 may provide assessments based on incoming sensor data, such as evaluations of individual objects and/or features, evaluations of a particular situation, and/or evaluations of potential impacts within a given situation.

The computer vision system 140 of the control system 106 may include hardware and software operable to process and analyze images in an effort to determine objects, environmental objects (e.g., stop lights, road way boundaries, etc.), and obstacles. As such, the computer vision system 140 may use object recognition, Structure From Motion (SFM), video tracking, and other algorithms used in computer vision, for instance, to recognize objects, map an environment, track objects, estimate the speed of objects, etc.

The navigation/pathing system 142 of the control system 106 may determine a driving path for the vehicle 100, which may involve dynamically adjusting navigation during operation. As such, the navigation/pathing system 142 may use data from the sensor fusion algorithm 138, the GPS 122, and maps, among other sources to navigate the vehicle 100. The obstacle avoidance system 144 may evaluate potential obstacles based on sensor data and cause systems of the vehicle 100 to avoid or otherwise negotiate the potential obstacles.

As shown in FIG. 1, the vehicle 100 may also include peripherals 108, such as a wireless communication system 146, a touchscreen 148, a microphone 150, and/or a speaker 152. The peripherals 108 may provide controls or other elements for a user to interact with the user interface 116. For example, the touchscreen 148 may provide information to users of the vehicle 100. The user interface 116 may also accept input from the user via the touchscreen 148. The peripherals 108 may also enable the vehicle 100 to communicate with devices, such as other vehicle devices.

The wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

The vehicle 100 may include the power supply 110 for powering components. The power supply 110 may include a rechargeable lithium-ion or lead-acid battery in some implementations. For instance, the power supply 110 may include one or more batteries configured to provide electrical power. The vehicle 100 may also use other types of power supplies. In an example implementation, the power supply 110 and the energy source 119 may be integrated into a single energy source.

The vehicle 100 may also include the computer system 112 to perform operations, such as operations described therein. As such, the computer system 112 may include at least one processor 113 (which could include at least one microprocessor) operable to execute instructions 115 stored in a non-transitory computer readable medium, such as the data storage 114. In some implementations, the computer system 112 may represent a plurality of computing devices that may serve to control individual components or subsystems of the vehicle 100 in a distributed fashion.

In some implementations, the data storage 114 may contain instructions 115 (e.g., program logic) executable by the processor 113 to execute various functions of the vehicle 100, including those described above in connection with FIG. 1. The data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by the vehicle 100 and the computer system 112 during the operation of the vehicle 100 in the autonomous, semi-autonomous, and/or manual modes.

The vehicle 100 may include the user interface 116 for providing information to or receiving input from a user of the vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., the propulsion system 102, the sensor system 104, and the control system 106), as well as from the user interface 116. For example, the computer system 112 may utilize input from the sensor system 104 in order to estimate the output produced by the propulsion system 102 and the control system 106. Depending upon the implementation, the computer system 112 could be operable to monitor many aspects of the vehicle 100 and its subsystems. In some implementations, the computer system 112 may disable some or all functions of the vehicle 100 based on signals received from the sensor system 104.

The components of the vehicle 100 could be configured to work in an interconnected fashion with other components within or outside their respective systems. For instance, in an example implementation, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of the GPS 122 and the features recognized by the computer vision system 140 may be used with map data stored in the data storage 114 to determine specific road parameters. Further, the radar unit 126 may also provide information about the surroundings of the vehicle. In other words, a combination of various sensors (which could be termed input-indication and output-indication sensors) and the computer system 112 could interact to provide an indication of an input provided to control a vehicle or an indication of the surroundings of a vehicle.

In some implementations, the computer system 112 may make a determination about various objects based on data that is provided by systems other than the radio system. For example, the vehicle 100 may have lasers or other optical sensors configured to sense objects in a field of view of the sensors (e.g., vehicle). The computer system 112 may use the outputs from the various sensors to determine information about objects in a field of view of the vehicle, and may determine distance and direction information to the various objects. The computer system 112 may also determine whether objects are desirable or undesirable based on the outputs from the various sensors.

Although FIG. 1 shows various components of the vehicle 100, i.e., the wireless communication system 146, the computer system 112, the data storage 114, and the user interface 116, as being integrated into the vehicle 100, one or more of these components could be mounted or associated separately from the vehicle 100. For example, the data storage 114 could, in part or in full, exist separate from the vehicle 100. Thus, the vehicle 100 could be provided in the form of device elements that may be located separately or together.

The device elements that make up the vehicle 100 could be communicatively coupled together in a wired and/or wireless fashion.

Figure 2:
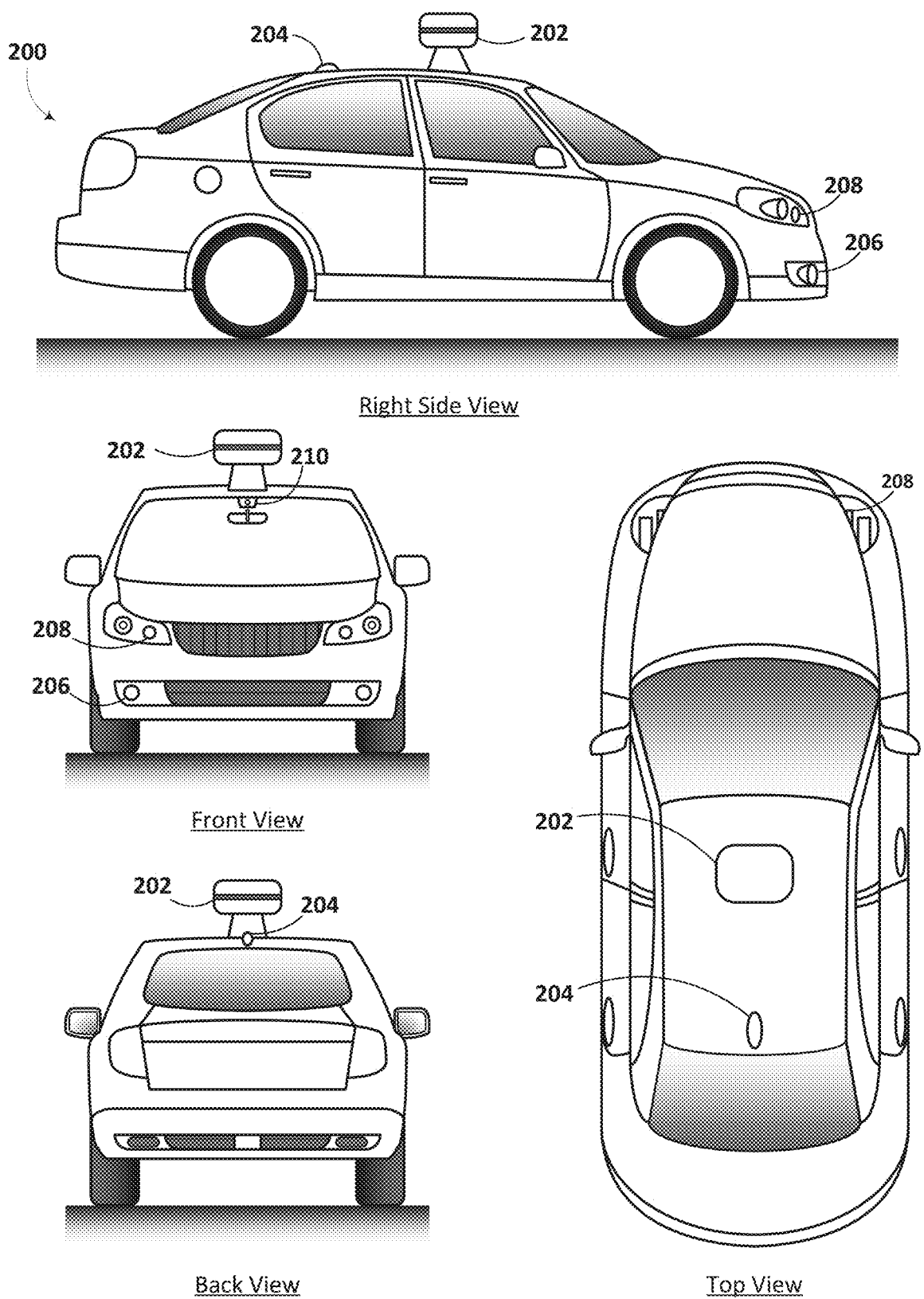
FIG. 2 is a conceptual illustration of a configuration of a vehicle, according to an example implementation.

FIG. 2 depicts an example physical configuration of the vehicle 200, which may represent one possible physical configuration of vehicle 100 described in reference to FIG. 1. Depending on the implementation, the vehicle 200 may include the sensor unit 202, the wireless communication system 204, the radio unit 206, the deflectors 208, and the camera 210, among other possible components. For instance, the vehicle 200 may include some or all of the elements of components described in FIG. 1. Although the vehicle 200 is depicted in FIG. 2 as a car, the vehicle 200 can have other configurations within examples, such as a truck, a van, a semi-trailer truck, a motorcycle, a golf cart, an off-road vehicle, or a farm vehicle, among other possible examples.

The sensor unit 202 may include one or more sensors configured to capture information of the surrounding environment of the vehicle 200. For example, the sensor unit 202 may include any combination of cameras, radars, LIDARs, range finders, radio devices (e.g., Bluetooth and/or 802.11), and acoustic sensors, among other possible types of sensors. In some implementations, the sensor unit 202 may include one or more movable mounts operable to adjust the orientation of sensors in the sensor unit 202. For example, the movable mount may include a rotating platform that can scan sensors so as to obtain information from each direction around the vehicle 200. The movable mount of the sensor unit 202 may also be movable in a scanning fashion within a particular range of angles and/or azimuths.

In some implementations, the sensor unit 202 may include mechanical structures that enable the sensor unit 202 to be mounted atop the roof of a car. Additionally, other mounting locations are possible within examples.

The wireless communication system 204 may have a location relative to the vehicle 200 as depicted in FIG. 2, but can also have different locations within implementations. The wireless communication system 200 may include one or more wireless transmitters and one or more receivers that may communicate with other external or internal devices. For example, the wireless communication system 204 may include one or more transceivers for communicating with a user's device, other vehicles, and roadway elements (e.g., signs, traffic signals), among other possible entities. As such, the vehicle 200 may include one or more vehicular communication systems for facilitating communications, such as dedicated short-range communications (DSRC), radio frequency identification (RFID), and other proposed communication standards directed towards intelligent transport systems.

The camera 210 may have various positions relative to the vehicle 200, such as a location on a front windshield of vehicle 200. As such, the camera 210 may capture images of the environment of the vehicle 200. As illustrated in FIG. 2, the camera 210 may capture images from a forward-looking view with respect to the vehicle 200, but other mounting locations (including movable mounts) and viewing angles of the camera 210 are possible within implementations. In some examples, the camera 210 may correspond to one or more visible light cameras. Alternatively or additionally, the camera 210 may include infrared sensing capabilities. The camera 210 may also include optics that may provide an adjustable field of view.

Figure 3:
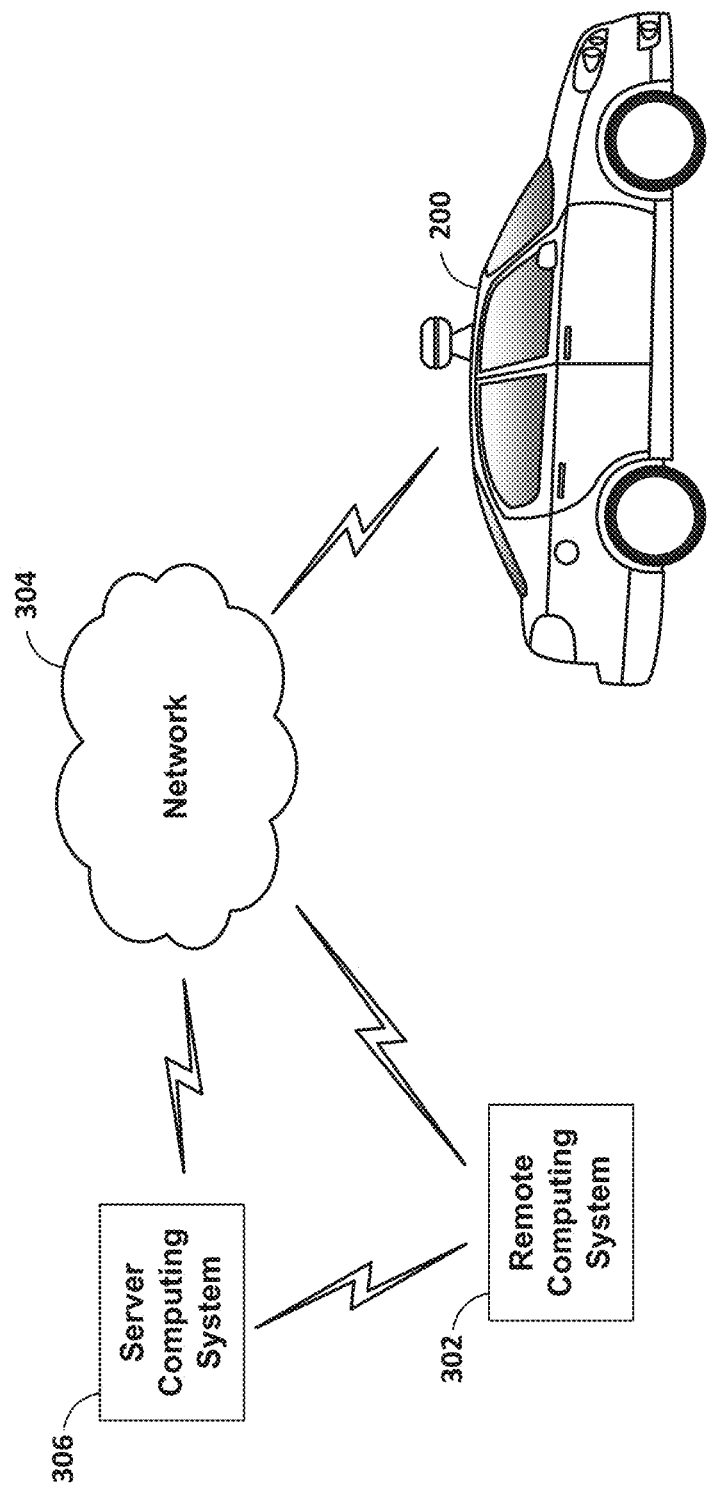
FIG. 3 is a conceptual illustration of wireless communication between various computing systems related to an autonomous vehicle, according to an example implementation.

FIG. 3 is a conceptual illustration of wireless communication between various computing systems related to an autonomous vehicle, according to an example implementation. In particular, wireless communication may occur between a remote computing system 302 and the vehicle 200 via a network 304. Wireless communication may also occur between a server computing system 306 and the remote computing system 302, and between the server computing system 306 and the vehicle 200.

The vehicle 200 can correspond to various types of vehicles capable of transporting passengers or objects between locations and may take the form of any one or more of the vehicles discussed above. In some instances, the vehicle 200 may operate in an autonomous mode that enables a control system to safely navigate the vehicle 200 between destinations using sensor measurements. When operating in an autonomous mode, the vehicle 200 may navigate with or without passengers. As a result, the vehicle 200 may pick up and drop off passengers between desired destinations.

The remote computing system 302 may represent any type of device related to remote assistance techniques, including but not limited to those described herein. Within examples, the remote computing system 302 may represent any type of device configured to (i) receive information related to the vehicle 200, (ii) provide an interface through which a human operator can in turn perceive the information and input a response related to the information, and (iii) transmit the response to vehicle 200 or to other devices. The remote computing system 302 may take various forms, such as a workstation, a desktop computer, a laptop, a tablet, a mobile phone (e.g., a smart phone), and/or a server. In some examples, the remote computing system 302 may include multiple computing devices operating together in a network configuration.

The remote computing system 302 may include one or more subsystems and components similar or identical to the subsystems and components of vehicle 200. At a minimum, the remote computing system 302 may include a processor configured for performing various operations described herein. In some implementations, the remote computing system 302 may also include a user interface that includes input/output devices, such as a touchscreen and a speaker. Other examples are possible as well.

The network 304 represents infrastructure that enables wireless communication between the remote computing system 302 and the vehicle 200. The network 304 also enables wireless communication between the server computing system 306 and the remote computing system 302, and between the server computing system 306 and the vehicle 200.

The position of the remote computing system 302 can vary within examples. For instance, the remote computing system 302 may have a remote position from the vehicle 200 that has a wireless communication via the network 304. In another example, the remote computing system 302 may correspond to a computing device within the vehicle 200 that is separate from the vehicle 200, but with which a human operator can interact while a passenger or driver of the vehicle 200. In some examples, the remote computing system 302 may be a computing device with a touchscreen operable by the passenger of the vehicle 200.

In some implementations, operations described herein that are performed by the remote computing system 302 may be additionally or alternatively performed by the vehicle 200 (i.e., by any system(s) or subsystem(s) of the vehicle 200). In other words, the vehicle 200 may be configured to provide a remote assistance mechanism with which a driver or passenger of the vehicle can interact.

The server computing system 306 may be configured to wirelessly communicate with the remote computing system 302 and the vehicle 200 via the network 304 (or perhaps directly with the remote computing system 302 and/or the vehicle 200). The server computing system 306 may represent any computing device configured to receive, store, determine, and/or send information relating to the vehicle 200 and the remote assistance thereof. As such, the server computing system 306 may be configured to perform any operation(s), or portions of such operation(s), that is/are described herein as performed by the remote computing system 302 and/or the vehicle 200. Some implementations of wireless communication related to remote assistance may utilize the server computing system 306, while others may not.

The server computing system 306 may include one or more subsystems and components similar or identical to the subsystems and components of the remote computing system 302 and/or the vehicle 200, such as a processor configured for performing various operations described herein, and a wireless communication interface for receiving information from, and providing information to, the remote computing system 302 and the vehicle 200.

The various systems described above may perform various operations. For example, a computing or sensor system (e.g., the remote computing system 302, the server computing system 306, or a computing system local to the vehicle 200) may operate sensors or sensor devices to capture sensor information of the environment of an autonomous vehicle. In general, at least one computing device or system will be able to analyze the sensor information and possibly control the autonomous vehicle.

In some implementations, to facilitate autonomous operation, a vehicle (e.g., the vehicle 200) may receive data representing objects in an environment in which the vehicle operates (also referred to herein as "environment data") in a variety of ways. A sensor or computing system on the vehicle may provide the environment data representing objects of the environment. For example, the vehicle may have various sensors, including a camera, a radar sensor, a laser range finder/lidar sensor, an image sensor, a microphone, and other sensors. Each of these sensors may communicate data to a computing device (e.g., a processor) in the vehicle about information each respective sensor receives.

In some implementations, the computing device (e.g., a controller or processor) or computing system may be able to combine information from the various sensors in order to make further determinations of the environment of the vehicle. For example, the processing system may combine data from a lidar sensor or a radar sensor and an image sensor to determine if another vehicle or pedestrian is in front of the autonomous vehicle. In other implementations, other combinations of sensor data may be used by the computing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The computing or processing system of the vehicle may alter the control of the vehicle based on the environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this operation, the vehicle may analyze the environment data representing objects of the environment to determine at least one object having a detection confidence below a threshold. A computing device or processor in the vehicle may be configured to detect various objects of the environment based on environment data from various sensors. For example, in one implementation, the computing device may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some implementations, the environment data may be received from a camera and include image or video data. In other implementations, the environment data may be received from a lidar sensor. The vehicle may analyze the captured image or video data to identify objects in the image or video data. The methods and apparatuses may be configured to monitor image and/or video data for the presence of objects of the environment. In other implementations, the environment data may be radar, audio, or other data. The vehicle may be configured to identify objects of the environment based on the radar, audio, or other data.

In some implementations, the techniques the vehicle uses to detect objects may be based on a set of known data. For example, data related to environmental objects may be stored to a memory located in the vehicle. The vehicle may compare received data to the stored data to determine objects. In other implementations, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other implementations, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some implementations, the vehicle may react as if the detected object is present despite the low confidence level. In other implementations, the vehicle may react as if the detected object is not present.

When the vehicle detects an object of the environment, it may also calculate a confidence associated with the specific detected object. The confidence may be calculated in various ways depending on the implementation. In one example, when detecting objects of the environment, the vehicle may compare environment data to predetermined data relating to known objects. The closer the match between the environment data to the predetermined data, the higher the confidence. In other implementations, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some implementations, via a server (e.g., server computing system 306). The human operator of the remote computing system may in turn use the environment data as a basis for responding to the request.

In some implementations, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of vehicle (e.g., a speed and/or direction), among other possible adjustments.

In other implementations, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4:
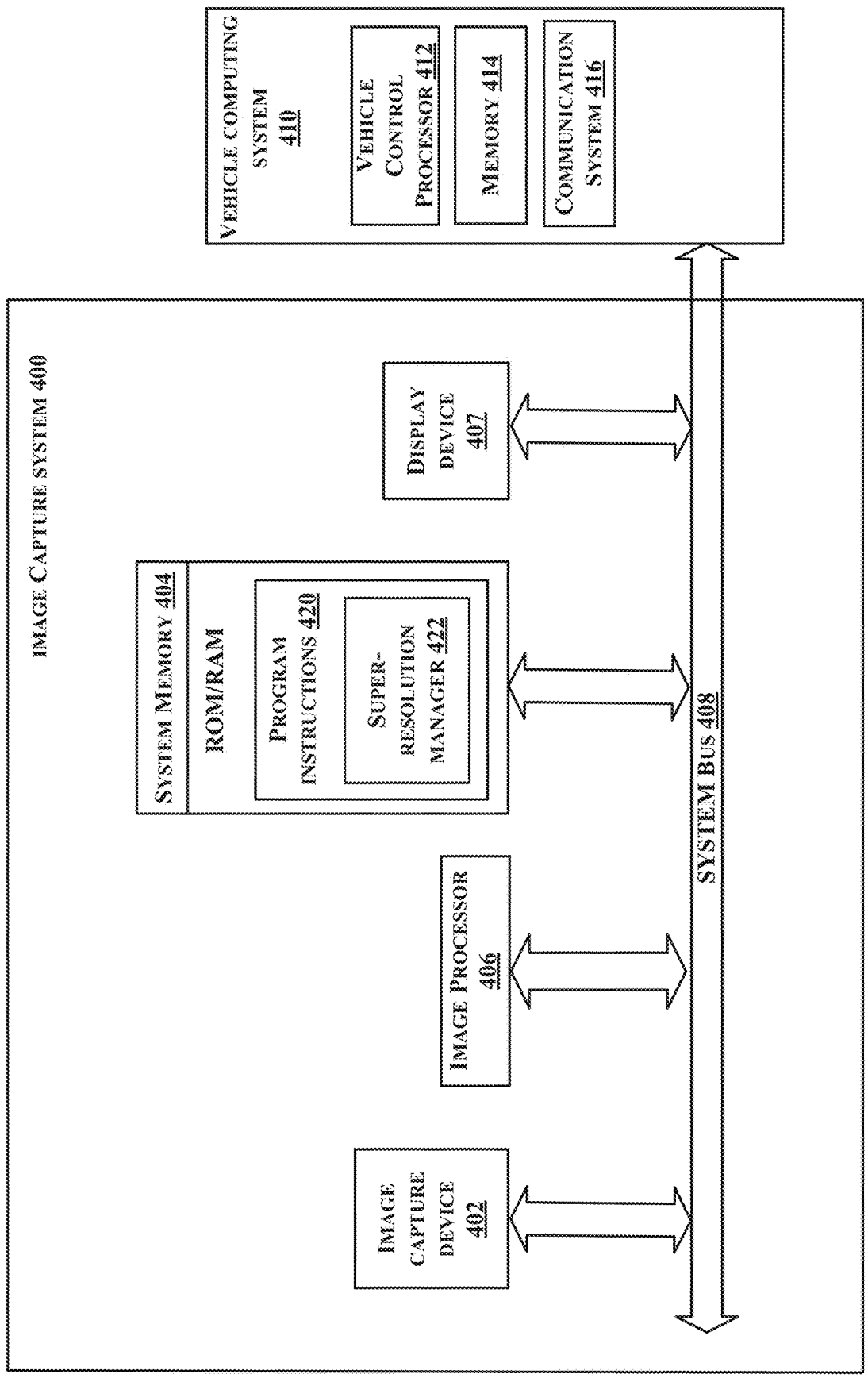
FIG. 4 is a simplified block diagram depicting components of a camera system, according to an example implementation.

FIG. 4 is a simplified block diagram depicting components of an example camera system 400 of a vehicle for capturing images. The camera system 400 may correspond to the camera system 130 of FIG. 1. In some examples, the vehicle may include more than one camera system. For example, the vehicle may include one camera system mounted to a top of the vehicle in a sensor dome and another camera system may be located behind the windshield of the vehicle. In other examples, the various camera systems may be located in various different positions throughout the vehicle.

The camera system 400 may capture images of an environment surrounding a vehicle and create enhanced images of a scene of the environment. The images may be captured by an image capture device during movement of the image capture device. The movement of the image capture device may result in the capture of multiple image frames that have subpixel offsets of the image of the scene across the multiple image frames. The camera system 400 may perform super-resolution computations, based on the sub-pixel offsets of the image of the scene, and may create the enhanced images (e.g., super-resolution and/or denoised images) of the scene based on the super-resolution computations. The camera system 400 may generate the enhanced images of the scene without detrimental artifacts, such as chromatic aliasing, false gradients, and Moiré patterns. By creating the super-resolution image, the computing device may increase the signal-to-noise ratio (SNR) of the multiple image frames of the scene.

As shown in FIG. 4, the camera system 400 may include an image capture device 402, a system memory 404 (e.g., a computer-readable storage media (CRM)), a processor 406, and a display device 407. The camera system 400 may be configured to capture image data and transmit the image data to the components and/or systems of the vehicle. In some implementations, the processor 406 may comprise multiple processors and the system memory 404 may or may not be located within the same physical housing as the processor 406. The camera system 400 may also include one or more motion sensors (e.g., a gyroscope, an accelerometer) that detect a motion condition of the image capture device 402. Although various components of the camera system 400 are shown as distributed components, it should be understood that any of such components may be physically integrated and/or distributed according to a desired configuration of the camera system 400.

Further, the camera system 400 may include a system bus 408. Although depicted as a single bus, the system bus 408 may be composed of multiple buses. The system bus 408 may be implemented using any suitable communication technology and may include connection technology that allows multiple components to share the system bus 408. For example, the system bus 408 may be configured to enable the transfer of image frames (e.g., image data) between the image capture device 402, the system memory 404, and/or the processor 406. Further, the system bus 408 may communicatively couple the camera system 400 with a vehicle computing system 410. For example, the system bus 408 may enable the image capture device 402 and/or the processor 406 to send image data to the vehicle computing system 410.

The vehicle computing system 410 may include a vehicle-control processor 412, a memory 414, a communication system 416, and other components. The vehicle computing system 410 may be located in the autonomous vehicle. In some examples, the vehicle computing system 410 may comprise a navigation system of the vehicle. The communication system 416 of the vehicle computing system 410 may be configured to communicate data between the vehicle and a remote device or computer server. The memory 414 may be used for longer term storage than the system memory 404. Further, the memory 414 of the vehicle computing system 410 may have a larger capacity than the system memory 404 of the camera system 400. Further, the vehicle computing system 410 may be configured to control various operations of the camera system 400, among other options.

The image capture device 402 of the camera system 400 may be configured to capture image data and transfer the image data to the system memory 404 and/or the processor 406. In some examples, the image capture device 402 may include a camera or an image sensor. The image capture device 402 may be implemented using any suitable image sensor technology, including a charge coupled device (CCD) or a complementary metal oxide semiconductor (CMOS) image sensor. The image capture device 402 may include pixel elements arranged in a two-dimensional grid or array to detect image data. When the pixel elements of the image capture device 402 are sampled, the values associated with each pixel element may be captured by the image capture device to generate an image frame (e.g., image). The image frame may be representative of a two-dimensional image of a scene. In one implementation, the image frame may include a plurality of pixels, and each pixel may correspond to a set of pixel values, such as depth values, photometric values (e.g., red-green-blue (RGB) values, intensity values, chroma values, saturation values, etc.), or a combination thereof.

The image capture device 402 may include a color filter array (CFA) that overlays the pixel elements of the image capture device 402 and limits intensities, as associated with color wavelengths, of light recorded through the pixel elements. The CFA may, for example, comprise a Bayer CFA, which filters light according to a red wavelength, a blue wavelength, and a green wavelength.

In some examples, the image capture device may include a plurality of image sensors for capturing an image (e.g., a dual image sensor). The plurality of the image sensors may include combinations of pixel densities (e.g., 40 megapixel (MP), 32 MP, 16 MP, 8 MP) as well as different CFA configurations to support different image processing techniques (e.g., inclusion of a Bayer CFA to support red, green, and blue (RGB) image processing and exclusion of a CFA to support monochromatic-image processing). Light from the environment, when filtered through the Bayer CFA, may generate an image that can be referred to as a Bayer image or a Bayer image frame.

The image capture device 402 may be configured to capture a burst of a sequence of image frames across a range of exposure times (e.g., a payload burst). For example, the image capture device 402 may capture variations of a scene that correspond to multiple image frames of the image of the scene. The variations of the image of the scene, captured in the burst sequence by the image capture device 402, include sub-pixel offsets that are a result of the motion of the image capture device 402 while the image captured device 402 is capturing the image of the scene. For example, the motion of the image-capture device 402 may correspond to the movement of the vehicle. Further, the motion may be caused by a vibration that is induced during transportation of the image capture device 402 in the operating environment (e.g., the image capture device may be in motion due to the operation of a vehicle).

In some instances, and as an alternative to the sub-pixel offsets resulting from the motion of the image capture frame 402 during operation of the vehicle, the sub-pixel offsets may result from another motion applied to the image capture device 402, such as a haptic motion induced by a vibrating mechanism that is in contact with (or integrated with) the image capture device 402. Furthermore, and in some instances, the motion of the image capture device 402 may correspond to a movement or displacement induced by a system of the vehicle, such as an engine, a suspension system, and/or a multimedia system (e.g., a subwoofer) of the vehicle. The movement may induce an in-plane motion, an out-of-plane motion, a pitch, a yaw, or a roll to the image captured device 402 while the image capture device 402 is capturing the variations of the scene.

The display device 407 of the vehicle camera system may display images of the vehicle's surroundings including, for example, roadways, intersections, as well as other objects and information. The display device 407 may include a touchscreen display, a monitor having a screen, or any other electrical device that is operable to display information. The display device 407 may render super-resolution images of a scene. The super-resolution images may be viewable by a driver and/or passenger via the display device 407.

The system memory 404 of the camera system 400 may store information including image data that may be retrieved, manipulated, and/or stored by the processor 406. The system memory 404 may be larger than the internal memory included in the processor 406 and may act as the main memory for the camera system 400. In some examples, the system memory 404 may be located outside of or external to an integrated circuit (IC) containing the processor 406. The system memory 404 may comprise any type of volatile or non-volatile memory technology, such as random-access memory (RAM), static random access memory (SRAM), dynamic random access memory (DRAM), non-volatile random access memory (NVRAM), synchronous dynamic random access memory (SDRAM), read-only memory (ROM), Flash memory, or a combination thereof.

The system memory 404 may also be implemented as electrically erasable programmable read only memory (EE-PROM) or another non-volatile or volatile memory type. In some examples, the system memory 404 may be a memory cache or buffer to temporarily store image data. In some implementations, the system memory 404 may be part of the image captured device 402. Further, the system memory 404 may include program instructions 420 that are executable by the processor 406 to facilitate the various functions described herein. For example, image processing algorithms may be stored in the system memory 404 and executed by the processor 406.

In one example, the system memory 404 may include executable instructions in the form of a super-resolution manager or module 422. The instructions of the super-resolution manager 120 may be executed, using the processor 406, to cause the camera system 400 to perform operations directed to creating (and rendering) a super-resolution image of the scene. Such operations may include capturing multiple image frames of an image of a scene (e.g., the variations of the image of the scene) using the image capture device 402. The operations may further include the processor 406 performing super-resolution computations, accumulating color planes, combining the accumulated color planes to create a super-resolution image of the scene, and rendering (e.g., through the display 407) the super-resolution image of the scene. The super-resolution image of the scene, in general, has a resolution that is higher than other resolutions of the multiple image frames of the image of the scene.

The processor 406 of the camera system 400 may be communicatively coupled to the image capture device 402 and the system memory 404. The processor 406 may be a single core processor or a multiple core processor composed of a variety of materials, such as silicon, polysilicon, high-K dielectric, copper, and so on. The processor 406 may include any type of processor including, but not limited to, a microprocessor, a microcontroller, a digital signal processor (DSP), an image processor, an application specific integrated circuit (ASIC), a graphic processing unit (GPUs), a tensor processing units (TPU), a deep learning unit, discrete analog or digital circuitry, or a combination thereof. In some examples, the camera system 400 may include more than one processor. For example, the camera system 400 may include a central processing unit (CPU), a graphics processing unit (GPU), a digital signal processor (DSP), and/or an image processing unit (IPU). Furthermore, and in such an instance, the multiple processors may perform two or more computing operations using pipeline-processing.

The processor 406 of the camera system 400 may perform image processing functions on the image data captured by the image capture device 402, such as image enhancement (e.g., noise reduction), image stabilization (e.g., to compensate for movement of a camera), object recognition (e.g., finding a specific object in two or more images), as well as other functions. In addition, the processor 406 may apply any of a number of data reduction techniques to the image data, such as redundancy avoidance, lossless compression, and lossy compression.

In some implementations, the processor 406 may be capable of producing real-time super-resolution images of a scene. The processor 406 may use the super-resolution images of the scene to improve the ability to detect objects in the scene. For example, the processor 406 may detect objects in the scene more quickly and may detect objects more easily in low light conditions. The processor 406 may also use the super-resolution images to increase the reliability of object detection and to more accurately classify objects. Further, the processor 406 may use the super-resolution images to optical enlarge images of a scene. For example, the super-resolution images may achieve about a 1.6-2.0 times optical zoom of the scene.

In some embodiments, the processor 406 may be configured to detect motion of the image capture device 406. Further, the processor 406 may be configured to cause physical movement or change in positions of the image capture device 402. In some instances, the processor may direct or cause a change in position of the pixel elements of the image capture device 402 or may cause a component of the vehicle to induce motion of the image capture device 402. In one implementation, the processor 406 may change a state of a system of the vehicle to induce movement of the image capture device 402. For example, the processor 406 may change or adjust the state of the engine (e.g., idle rate), the suspension (e.g., adjust height suspension), a multimedia system (e.g., a subwoofer), or the like. Due to the movement introduced to the image capture device 402, the image capture device 402 may capture multiple variations of the image of the scene.

The processor 406 may be configured to receive image data from the image capture device 402 and combine the image data using various image processing techniques. For example, the processor 406 may receive a burst of image frames (e.g., a sequence of images) from the image capture device 402 and may store the image frames in a memory, such as the system memory 404 or memory coupled to or included in the processor 406. Further, the processor 406 may also be configured to fetch or retrieve the image data associated with the image frames from memory as well as modify the image frames.

Figure 5:
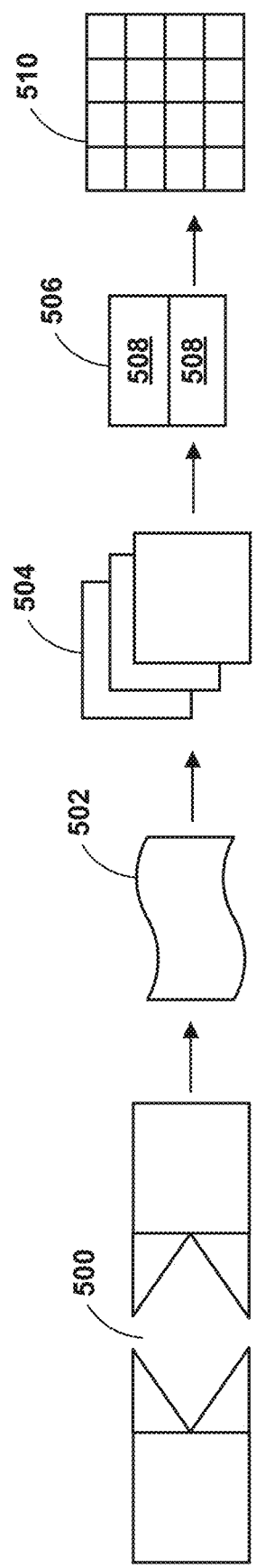
FIG. 5 is a conceptual illustration of a sequence of image frames, according to an example implementation.

The processor 406 may be configured to partition or divide the image data associated with the image frames into a number of regions (e.g., tiles or blocks) and perform image processing operations (e.g., motion estimation) on one or more of the regions. For example, the processor 406 may receive an image stream 500 as shown in FIG. 5. The image stream 500 may include a sequence or series of images or image frames 502. The sequence 502 may include a number of adjacent or temporal image frames 504. While three frames are depicted as adjacent image frames 504, the sequence 502 can include any number of adjacent image frames 504.

The processor 406 may subdivide each of the adjacent image frames 504 into individual frames, for example, a single image frame 506. Further, the processor may divide or partition the single image frame 506 into a series of segments or planes 508. The segments (or planes) 508 may be subsets of image frames that permit parallel processing, for example. The segments 508 may also be subsets of image frames that separate the image data into different color components. For example, the image frame 506 of image data can include a luminance plane and two chrominance planes. The segments 508 may be sampled at different resolutions.

Further, the processor 406 may divide or partition the image frame 506 into equal-size tiles or blocks 510. Each tile may include a plurality of pixels, and each pixel may correspond to a set of pixel values, such as depth values, photometric values (e.g., red-green-blue (RGB) values, intensity values, chroma values, saturation values, etc.), or a combination thereof. The tiles may have dimensions of 16×16 pixels or 8×8 pixels. Further, the tiles may have a square or rectangular shape and may have a pixel height and pixel width. The tiles 510 may also be arranged to include image data from one or more planes of pixel values or data. In other examples, the tiles 510 may be of any other suitable size such as 4×4 pixels, 8×8 pixels, 16×8 pixels, 8×16 pixels, 16×16 pixels or larger. The processor 406 may store the image frames of the sequence in the tiled or block format in the internal memory of the processor 406 or in system memory, such as the system memory 404, for further processing. In some examples, groups of tiles from the same or different image frames may be processed in parallel using multiple processors.

Figure 6:
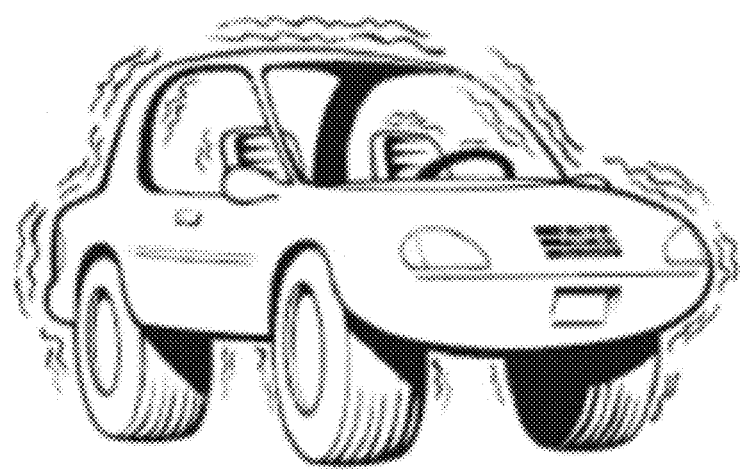
FIG. 6 illustrates example aspects of multiple image frames of an image having sub-pixel offsets.
Figure 6:
Figure 6:
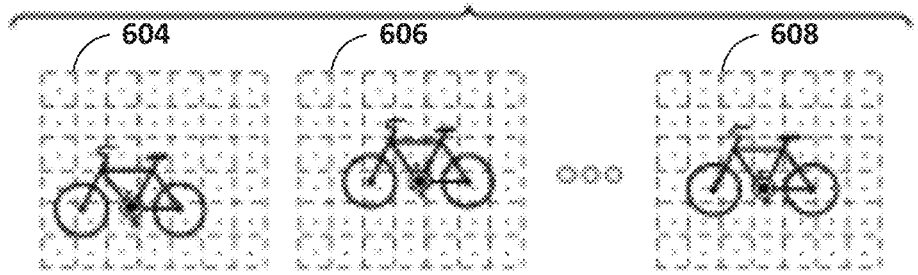

FIG. 6 illustrates example aspects of multiple image frames having sub-pixel offsets. In some instances, the multiple image frames having sub-pixel offsets may be caused by motion of the image capture device, such as the image capture device 402 of FIG. 4, during a burst sequence. The motion of the image-capture device may correspond to the movement of the vehicle or a displacement of the image capture device induced by a component or system (e.g., an engine, a vehicle suspension, etc.) of the vehicle. For example, the motion of the image-capture device may correspond to a displacement induced by a component or system of the vehicle, such as the vehicle's engine, suspension system, multimedia system (e.g., a subwoofer), etc. In some instances, and as an alternative to the sub-pixel offsets resulting from the vehicle movement, the sub-pixel offsets may result from another motion applied to the image capture device, such as a haptic motion induced by a vibrating mechanism that is in contact with (or integrated with) the image capture device.

As illustrated in FIG. 6, multiple image frames 602 of the burst sequence may have respective, relative sub-pixel offsets of an image and include image frame 604, image frame 606, and image frame 608. For example, the image frames 604-608 may correspond to variations in the image frame due to motion. The multiple image frames 602 may serve as a basis for computing and forming the super-resolution image. The image capture device may capture the multiple image frames 602, using a resolution that is lower than another resolution of the image frames 622 of the scene, during the burst sequence.

The multiple image frames 602 of the burst sequence may be captured at a set time interval that may range, for example, from one millisecond to three milliseconds, one millisecond to five milliseconds, or one-half millisecond to ten milliseconds. Furthermore, and in some instances, the time interval of the burst sequence may be variable based on lighting conditions and/or the motion of the image capture device (e.g., a time interval may be "shorter" during a high-velocity motion of the image capture device than another time interval during a low-velocity motion of the image capture device to keep the offsets at less than a predetermined number of pixels, such as one pixel).

The introduction of the movement during the burst sequence effectuates the image capture device capturing the multiple frames 606 such that the multiple image frames 606 have respective, relative sub-pixel offsets. As illustrated, the image represented by the image frame 606 is respectively offset, relative to the image represented by the image frame 604, one half-pixel horizontally and one half-pixel vertically. Furthermore, the image represented by the image frame 608 is respectively offset, relative to the image represented by the image frame 604, one-quarter pixel horizontally. Respectively, relative sub-pixel offsets can include different magnitudes and combinations of sub-pixel offsets (e.g., one sub-pixel offset associated with one image frame may be one-quarter pixel horizontally and three-quarters of a pixel vertically, while another sub-pixel offset that is associated with another image frame might be zero pixels horizontally and one-half of a pixel vertically). In general, the techniques and systems described by this present disclosure can accommodate sub-pixel offsets that are more random than the illustrations and descriptions of the image frames 604-608, including sub-pixel offsets that are non-linear.

Figure 7:
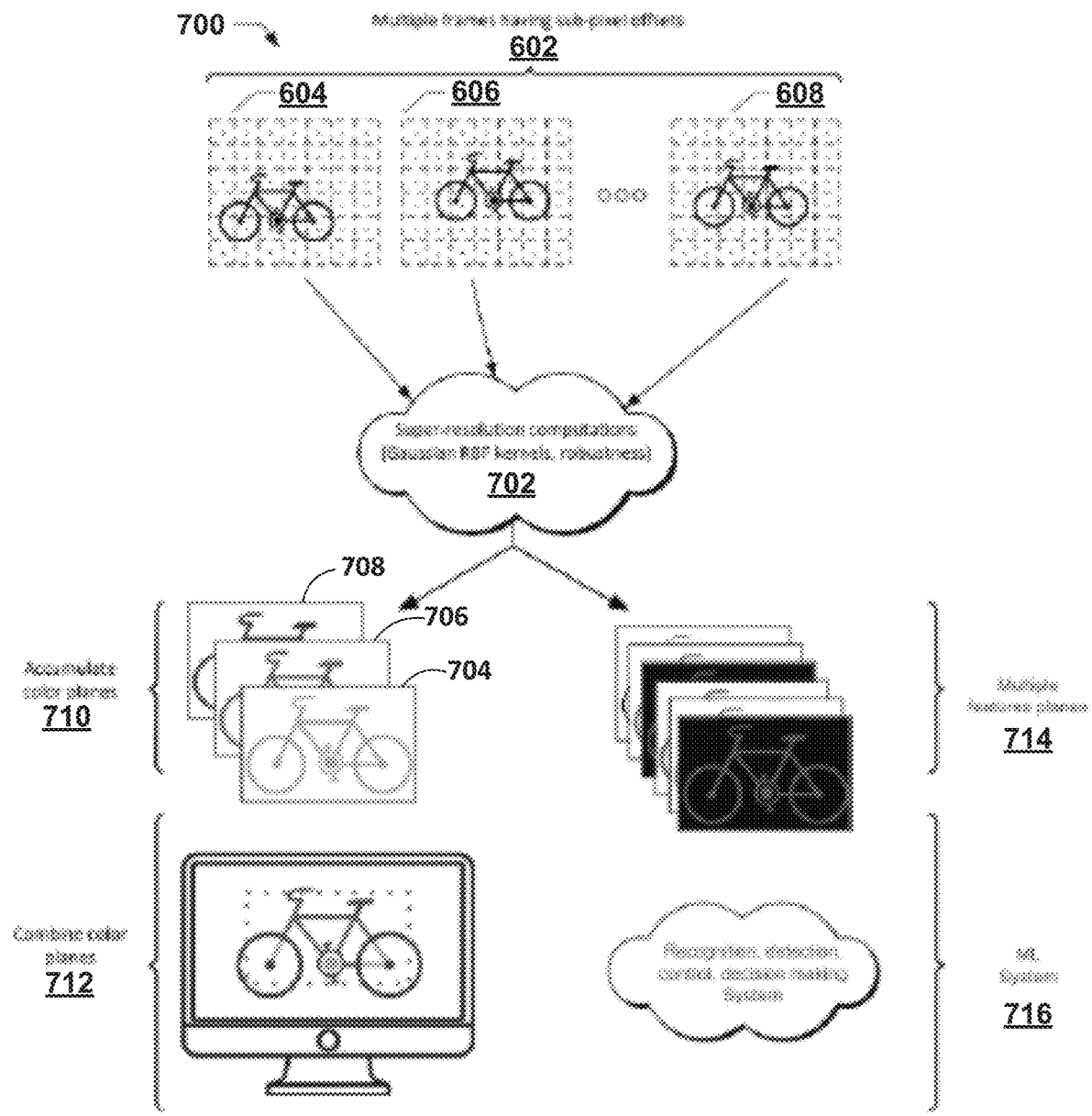
FIG. 7 illustrates example aspects of using multiple image frames having sub-pixel offsets to perform computations, accumulate color planes, and combine color planes.

FIG. 7 illustrates example aspects of a method 700 of using multiple image frames having sub-pixel offsets to perform computations, to accumulate color planes, and to combine color planes in accordance with one or more aspects. The example aspects of the method 700 may use elements of FIG. 4 and FIG. 6, wherein performing the computations, accumulating the color planes, and combining the color planes are performed by the camera system 400 of FIG. 4 and the multiple image frames having the sub-pixel offsets may be the multiple image frames 602 of FIG. 6.

As illustrated in FIG. 7, the multiple image frames 602 are input to a super-resolution computation module or unit 702. The super-resolution computation module 702 may correspond to the processor 406 of the camera system 400 of FIG. 4. The super-resolution computation module 702 may perform super-resolution computations including Gaussian radial basis function (RBF) kernel computations and robustness model computations. In some instances, the super-resolution computation module 702 (e.g., the processor 406 of the camera system 400) may perform portions of the super-resolution computation using pipeline-processing. The combination of the Gaussian RBF kernel computations (e.g., a kernel regression technique), along with weighting from the robustness computations, provides a means of determining contributions of pixels to color planes.

To perform Gaussian RBF kernel computations, the super-resolution computation module 702 filters pixel signals from each image frame of the multiple image frames 602 to generate respective color-specific image planes corresponding to color channels. The super-resolution computation module 702 then aligns the respective color-specific image planes to a reference frame. In some instances, the reference frame may be formed through creating red/green/blue (RGB) pixels corresponding to Bayer quads by taking red and blue values directly and averaging green values together.

The super-resolution computation module 702 then computes a covariance matrix. Computing the covariance matrix may include analyzing local gradient structure tensors for content of the reference frame (e.g., a local tensor may be local to an edge, a corner, or a textured area contained within the reference frame). Using the covariance matrix, the super-resolution computation module 702 can compute the Gaussian RBF kernels.

Computing the covariance matrix may rely on the following mathematical relationship:

$$\Omega = [e_1 \ e_2] \begin{bmatrix} k_1 & 0 \\ 0 & k_2 \end{bmatrix} \quad (1)$$

In mathematical relationship (1), $\Omega$ represents a kernel covariance matrix, $e_1$ and $e_2$ represent orthogonal direction vectors and two associated eigenvalues $\lambda_1$ and $\lambda_2$, and $k_1$ and $k_2$ control a desired kernel variance.

In mathematical relationship (1), $\Omega$ represents a kernel covariance matrix, $e_1$ and $e_2$ represent orthogonal direction vectors and two associated eigenvalues $\lambda_1$ and $\lambda_2$, and $k_1$ and $k_2$ control a desired kernel variance.

Computing the local gradient structure tensors may rely on the following mathematical relationship:

$$\hat{\Omega} = \begin{bmatrix} I_x^2 & I_x I_y \\ I_x I_y & I_y^2 \end{bmatrix} \quad (2)$$

In mathematical relationship (2), $I_x$ and $I_y$ represent local image gradients in horizontal and vertical directions, respectively.

To perform the robustness model computations, the super-resolution computation module 702 may use a statistical neighborhood model to formulate probabilities of pixels contributing to a super-resolution image (e.g., pixels from the multiple image frames 602 contributing to the super-resolution image of the scene). The statistical neighborhood model may analyze local statistics such as a mean, a variance, or a Bayer pattern local quad green channel disparity difference to form a model that predicts aliasing (e.g., pixel signaling with frequency content above half of a sampling rate that manifests as a lower frequency after sampling). The robustness model computations, in some instances, may include denoising computations to compensate for color differences. The denoising computations may, in some instances, rely on a spatial color standard deviation or a mean difference between frames.

Additional or alternative techniques may also be included in the super-resolution computations. For example, the super-resolution computations may include analyzing downscaling operations to find regions of an image that cannot be aligned correctly. As another example, the super-resolution computations may include detecting characteristic patterns to mitigate misalignment artifacts. In such an instance, signal gradient pattern analysis may detect artifacts such as "checkerboard" artifacts.

The super-resolution computations are effective to estimate, for each of the multiple image frames 602 (e.g., for image frame 604, 606, and 608), the contribution of pixels to color channels associated with respective color planes, e.g., a first color plane 704 (which may be a red color plane associated to a red color channel), a second color plane 706 (which may be a blue color plane associated to a blue color channel), and a third color plane 708 (which may be a green color plane associated to a green color channel). The super-resolution computation module 702 may treat the pixels as separate signals and accumulate the color planes simultaneously.

Also, and as illustrated in FIG. 7, a color plane accumulation operation 710 accumulates the color planes 704, 706, and 708. Accumulation of the color planes 704, 706, and 708 may include normalization computations that rely on the following mathematical relationship.

$$C(x, y) = \frac{\sum_n \sum_i c_{n,i} \cdot w_{n,i} \cdot \hat{R}_n}{\sum_n \sum_i w_{n,i} \cdot \hat{R}_n} \quad (3)$$

In mathematical relationship (3), x and y represent pixel coordinates, the sum $\Sigma_n$ operates over (or is a sum of) contributing frames, the sum $\Sigma_i$ is a sum of samples within a local neighborhood, $c_{n,i}$ represents a value of a Bayer pixel at a given frame n and sample i, $w_{n,i}$ represents a local sample weight, and RA represents a local robustness. The accumulated color planes may be combined to create the super-resolution image of the scene.

In some examples, the super-resolution computations may include analyzing the influence of motion blur. Such super-resolution computations may analyze the influence of motion blur of multiple images (e.g., the multiple image frames 606) using a "volume of solutions" computational approach that addresses uncertainties in pixel measurements due to quantization errors.

In some examples, the super-resolution computations may include computations that use a frame-recurrent approach. Such an approach may use, iteratively, a previous low-resolution frame, a previously computed high-resolution image, and a current low-resolution frame to create a current super-resolution image (e.g., the previous low-resolution frame and the current low-resolution frame may be image frame 606 and image frame 608, respectively). The recurrent approach may include flow estimations to estimate a normalized, low-resolution flow map, upscaling the low-resolution flow map with a scaling factor to produce a high-resolution flow map, using the high-resolution flow map to warp a previous high-resolution image, mapping the warped, previous high-resolution image to a low-resolution space, and concatenating mapping of the low-resolution space to the current super-resolution image.

The super-resolution computations of FIG. 7 may also use algorithms and techniques that are other than or additional to those described in the previous examples. Regardless, and in accordance with the present disclosure, introducing movement to the one or more components of the camera system 400 are applicable to the other algorithms and techniques.

FIG. 7 also illustrates a combining operation 712 that creates the enhanced image of the scene (a super-resolution and/or denoised image). The processor 406 may then render the super-resolution image of the scene on a display, such as the display 407 of the camera system 400 of FIG. 4, and/or store the super-resolution image of the scene in a memory, such as the system memory 404 of the camera system 400. As described above, and as part of the super-resolution computations, the super-resolution computation module 702 filters pixel signals from each image frame of the multiple image frames 602 to generate color-specific image planes corresponding to color channels. Each color-specific image plane may be a representation of the image, filtered to a specific color channel (e.g., a red image plane, a blue image plane, and a green image plane). The processor then aligns the respective color-specific image planes to a reference frame as further described below.

Further, the super-resolution computing module 702 may perform operations 714 to output multiple feature planes as shown in FIG. 7. The systems of the vehicle may utilize the multiple feature frames as input to control the path of the vehicle in an environment and/or to make a determination about the location and identity of objects in the surrounding environment. For example, the vehicle system may compare the multiple feature frames to determine changes in positions of the vehicle, recognize and detect objects, etc. Further, the vehicle system may include a machine learning system that uses machine learning algorithms 716 to improve the accuracy as well the efficiency of the operations of the vehicle system. For example, the multiple image frames may be useful for training a number of applications including depth estimation, three-dimensional reconstruction, refocusing, high dynamic range imaging, recognition, detection, decision making, and the like.

Figure 8:
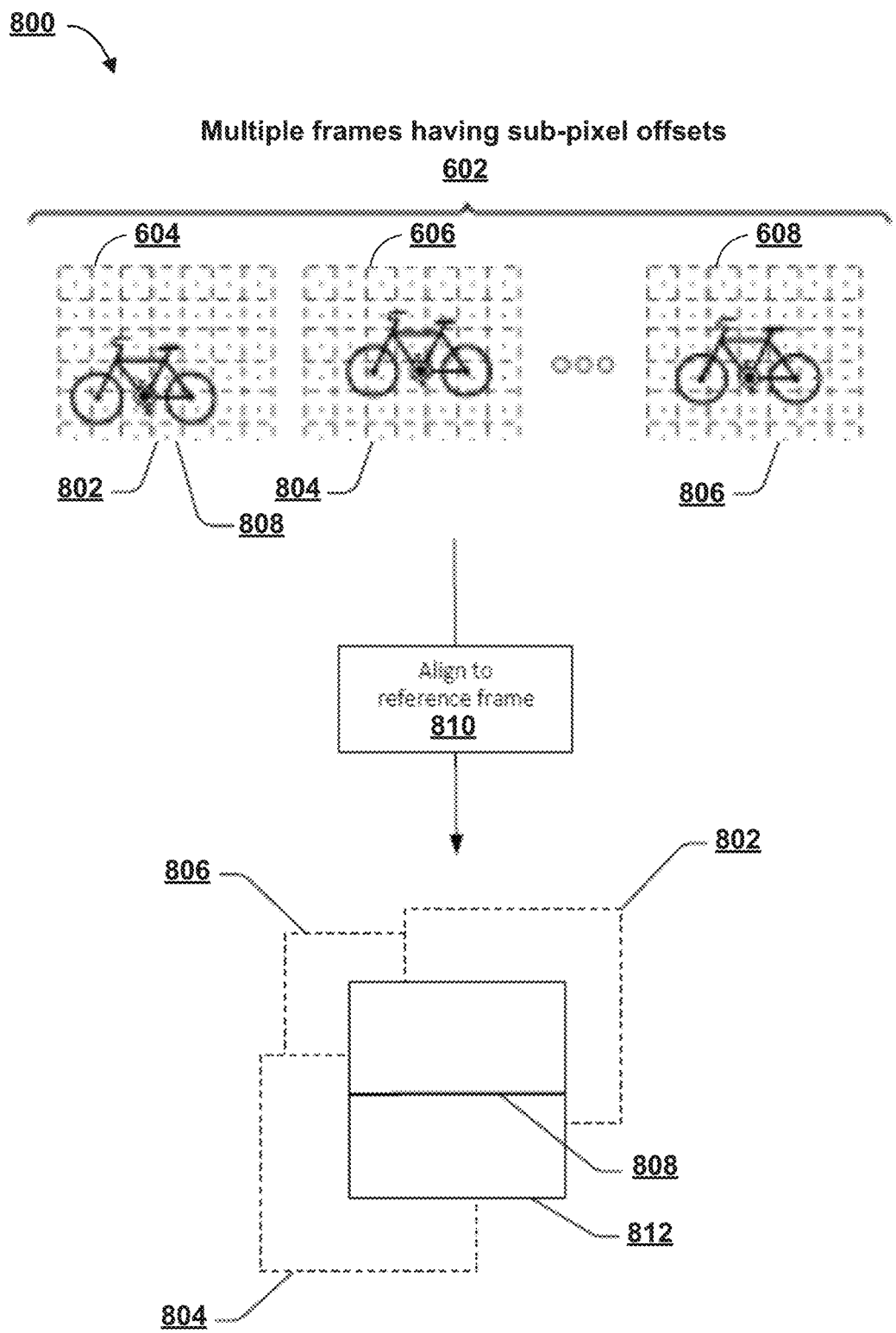
FIG. 8 illustrates example aspects of aligning multiple frames having sub-pixel offsets to a reference frame.

FIG. 8 illustrates example aspects of a method 800 associated with aligning multiple image frames having sub-pixel offsets to a reference frame. The example aspects of the method 800 may use elements of FIG. 4 and FIG. 6. As illustrated in FIG. 8, each of the multiple frames 602 (e.g., image frame 604, 606, and 608) are comprised of multiple pixels (e.g., representative pixels 802, 804, and 806, respectively). Each pixel corresponds to content 808 of the image frame (e.g., an edge, a corner, or a textured area of content of the image).

With respect to FIG. 8, the multiple image frames 604-608 having sub-pixel offsets are aligned to a reference frame at 810. Aligning the multiple image frames 602 to the reference frame includes aligning color-specific image planes (e.g., the multiple image frames 602 filtered according to a red wavelength, a blue wavelength, or a green wavelength) such that the corresponding content 808 of each pixel of the multiple image frames 602 aligns to corresponding content of pixel 812 of the reference frame. (Note: FIG. 8 is not drawn to scale and is simplified for descriptive purposes; in actuality, and depending on resolution capabilities of the image capture device 402, the corresponding content 808 may consume, or nearly consume, an entire pixel). For each pixel 802-806, the contribution of the content 808 to a color channel may be quantified through tensor analysis (e.g., analysis of a local gradient structure tensor quantifies the contribution of the content 808 of each pixel 802-806 to each color channel).

The elements described by FIGS. 6-8 support creating the super-resolution image of the scene while addressing multiple aspects of photography. In addition to providing the super-resolution image of the scene without the previously mentioned, detrimental artifacts of demosaicing (e.g., low image-resolution, chromatic aliasing, false gradients, and Moiré patterns), FIGS. 6-8 describe elements that produce the super-resolution image with low latency. Furthermore, the elements are robust to motion within a scene, scene changes, and low-light conditions.

Figure 9:
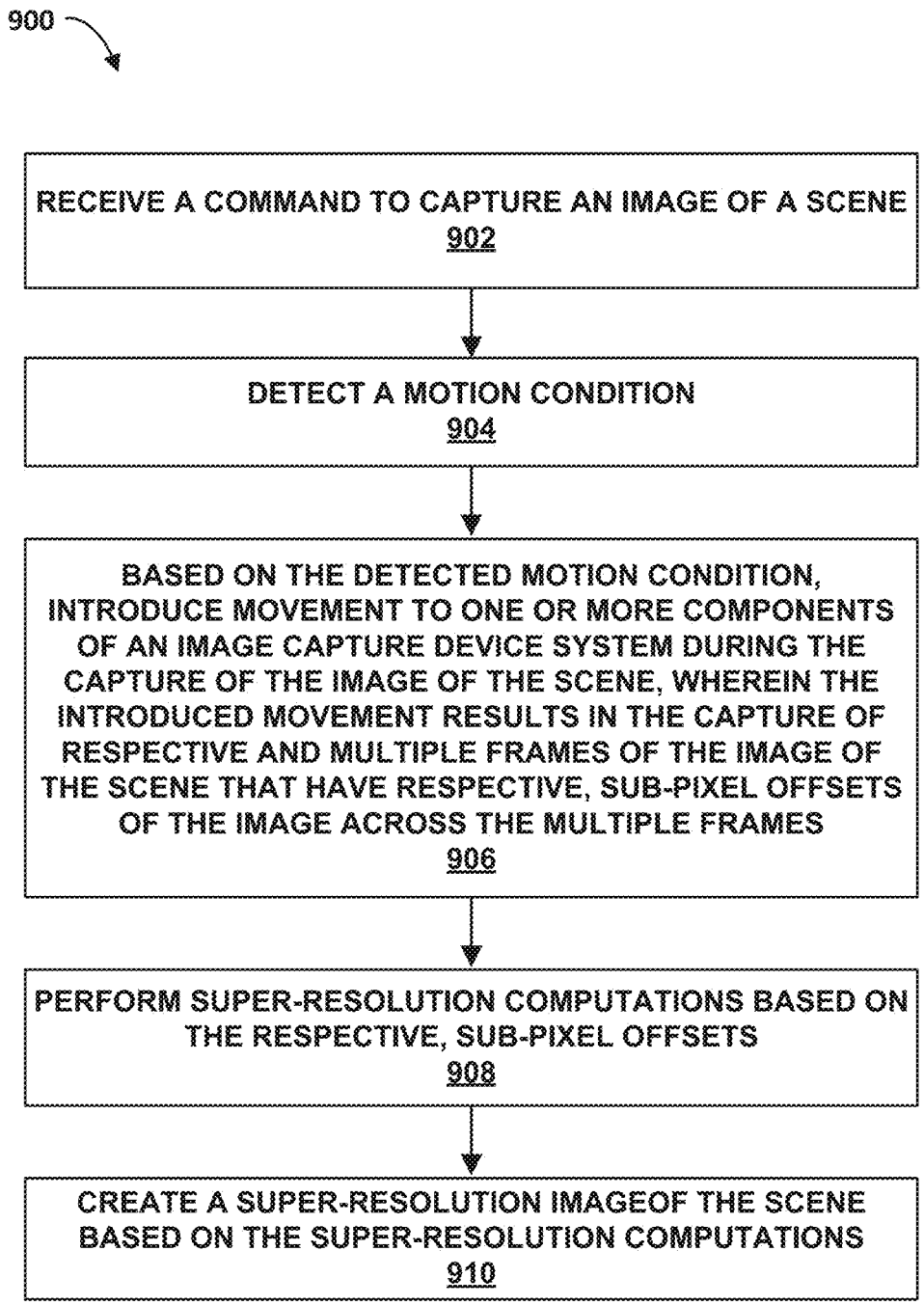
FIG. 9 illustrates a flow chart of a method to generate a super-resolution image, according to an example implementation.

FIG. 9 illustrates example aspects of a method 900 used as part of creating a super-resolution image of a scene. The method 900 represents an example method that may include one or more operations as depicted by one or more blocks 902-910, each of which may be carried out by any of the systems shown in FIGS. 1-4, among other possible systems. In an example implementation, a computing system or a sensor system (e.g., an image captured device, a sensor system 104, a control system 106, or camera system 400) performs the illustrated operations, although in other implementations, one or more other systems can perform some or all of the operations.

Those skilled in the art will understand that the flow charts described herein illustrate functionality and operations of certain implementations of the present disclosure. In this regard, each block of the flowcharts may represent a module, a segment, or a portion of program code, which includes one or more instructions executable by one or more processors for implementing specific logical functions or steps in the processes. The program code may be stored on any type of computer readable medium, for example, such as a storage device including a disk or hard drive.

In addition, each block may represent circuitry that is wired to perform the specific logical functions in the processes. Alternative implementations are included within the scope of the example implementations of the present application in which functions may be executed out of order from that shown or discussed, including substantially concurrent or in reverse order, depending on the functionality involved, as would be understood by those reasonably skilled in the art. Within examples, any system may cause another system to perform one or more of the operations (or portions of the operations) described below.

At block 902, an image capture system (e.g., the processor 406 of the image capture system 400) may receive a command to capture an image of a scene. The image capture system may receive the command from a system of a vehicle. In some embodiments, the image capture system may continuously capture images of a scene.

At block 904, the image capture system may include detecting a motion condition. Based on the detected motion condition, the image capture system may determine whether to induce or introduce motion to the image capture device at block 906. In an instance where the detected motion condition is a static motion condition, the image capture system may introduce or induce movement to the one or more components of the image capture system during capture of the image of the scene. For example, the image capture system may introduce an unsynchronized movement to the image capture device. In such an instance, the unsynchronized movement may be a movement corresponding to a sub-pixel offset. The introduced movement results in the capture of respective and multiple image frames of the image of the scene that have respective, sub-pixel offsets of the image across the multiple image frames. Introducing the movement may include introducing an in-plane movement or introducing an out-of-plane movement to the one or more components of the image capture device. When the image capture system detects motion of the image capture device, the image capture system may proceed to the operations at block 908.

At block 908, the image capture system (e.g., the processor 406 executing the instructions of the super-resolution manager 422) performs super-resolution computations based on the respective, sub-pixel offsets of the image of the scene across the multiple image frames. Examples of super-resolution computations include (i) computing Gaussian radial basis function kernels and computing a robustness model, (ii) analyzing the influence of motion blur across the multiple frames, and (iii) using a frame-recurrent approach that uses, from the multiple image frames, a previous low-resolution image frame and a current low-resolution frame to create a current super-resolution image.

At block 910, and based on the super-resolution computations, the image capture system (e.g., the processor 406 executing the instructions of the super-resolution manager 422) creates the super-resolution image of the scene.

Although the example method 900 of FIG. 9 is described in the context of being performed by the camera system 400 of FIG. 4, operations within the example method 900 (or portions of the operations) may be performed by one or more other devices having computational capabilities, such as a server or a cloud-computing device including instructions (or portions of instructions) of the super-resolution manager 422. For example, the image capture device 402 may capture the multiple frames of the image of the scene (e.g., block 902) and transmit or share the multiple frames with a server or cloud-computing device. Such a server or cloud-computing device may perform the super-resolution computations (e.g., block 908) and transmit, back to the image capture system 400, the super-resolution image of the scene.

Figure 10:
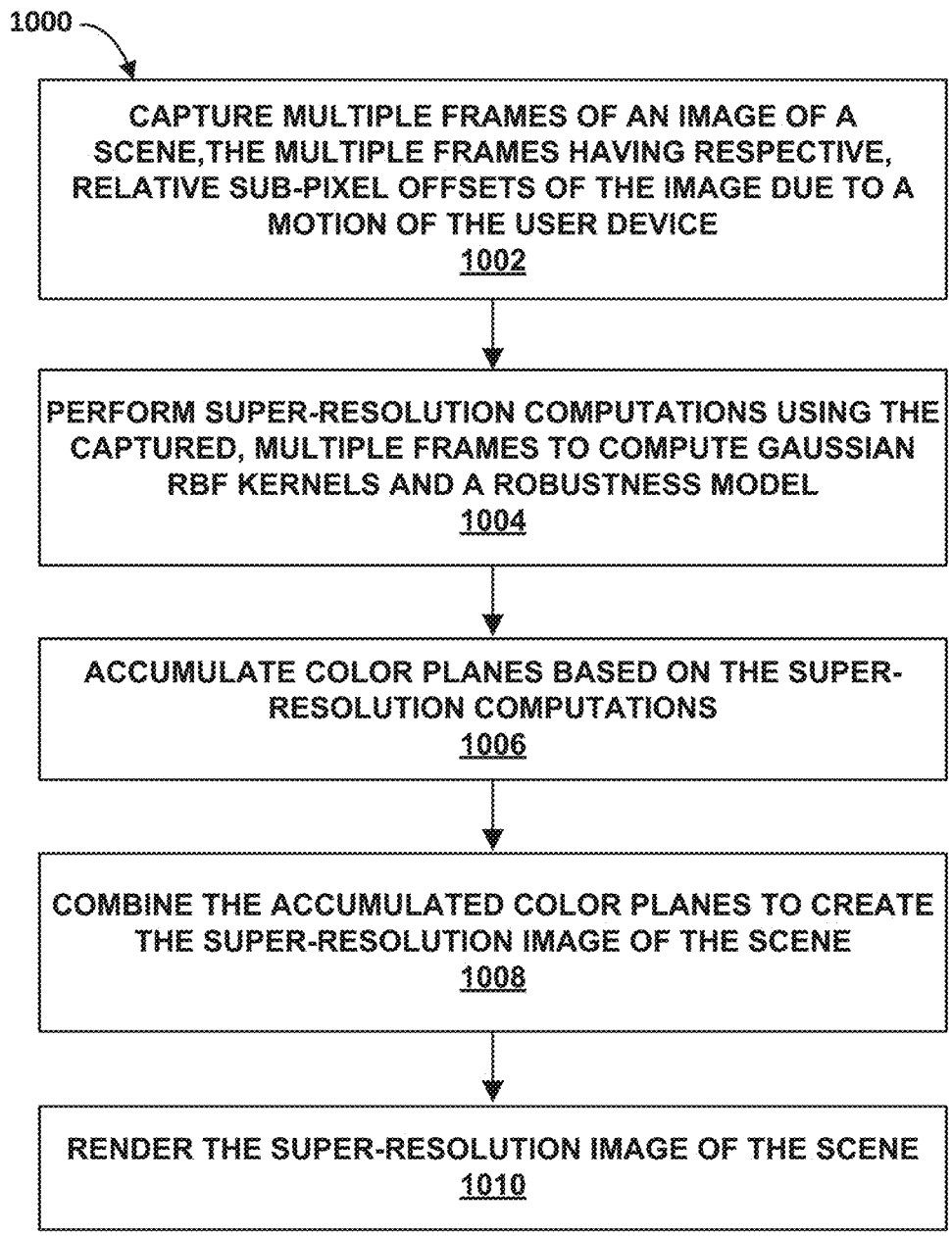
FIG. 10 illustrates a flow chart of a method to render a super-resolution image, according to an example implementation.

FIG. 10 illustrates example aspects of a method 1000 used as part of creating a super-resolution image of a scene. The method 1000 represents an example method that may include one or more operations as depicted by one or more blocks 1002-1010, each of which may be carried out by any of the systems shown in FIGS. 1-4, among other possible systems. In an example implementation, a computing system or a sensor system (e.g., an image captured device, a sensor system 104, a control system 106, or camera system 400) performs the illustrated operations, although in other implementations, one or more other systems can perform some or all of the operations.

Those skilled in the art will understand that the flow charts described herein illustrates functionality and operations of certain implementations of the present disclosure. In this regard, each block of the flowcharts may represent a module, a segment, or a portion of program code, which includes one or more instructions executable by one or more processors for implementing specific logical functions or steps in the processes. The program code may be stored on any type of computer readable medium, for example, such as a storage device including a disk or hard drive.

In addition, each block may represent circuitry that is wired to perform the specific logical functions in the processes. Alternative implementations are included within the scope of the example implementations of the present application in which functions may be executed out of order from that shown or discussed, including substantially concurrent or in reverse order, depending on the functionality involved, as would be understood by those reasonably skilled in the art. Within examples, any system may cause another system to perform one or more of the operations (or portions of the operations) described below.

At block 1002, an image capture device (e.g., the image captured device 402 of FIG. 4) captures, in a burst sequence, multiple image frames of an image of a scene, where the multiple image frames have respective, relative sub-pixel offsets of the image due to a motion of the image capture device during the capturing of the multiple frames. In some instances, the motion of the image device may correspond to motion of a vehicle. In other instances, the motion of the image capture device may correspond to a displacement or movement induced by a vibrating mechanism that is in contact with, or part of, the image capture device. Further, a system or component of the vehicle may cause motion of the image capture device. For example, movement or displacement (e.g., motion) of the image capture device may be induced or caused by the vehicle's engine, the vehicle's suspension, a multimedia system (e.g., a subwoofer) or the like.

At block 1004, a computing device or processor (e.g., the processor 406 of FIG. 4 executing the instructions of the super-resolution manager 422) performs super-resolution computations. Performing the super-resolution computations may use the captured, multiple image frames to compute Gaussian radial basis function kernels and compute a robustness model. Computing the Gaussian radial basis function kernels may include multiple aspects, such as filtering pixel signals from each of the multiple image frames to generate color-specific image planes for respective color channels and aligning the color-specific image planes to a reference frame. In addition to corresponding to red, green and blue color channels, the color-specific image planes may also correspond to chromatic color channels (e.g., shades of black, white, and grey) or other color-channels such as cyan, violet, and so on.

Computing the Gaussian radial basis function kernels may also include computing a kernel covariance matrix (e.g., mathematical relationship (1)) based on analyzing local gradient structure tensors (e.g., mathematical relationship (2)) generated by aligning the color-specific image planes to the reference frame. In such instances, the local gradient structure tensors may correspond to edges, corners, or textured areas of content included in the reference frame. Furthermore, and also as part of block 1004, computing the robustness may include using a statistical neighborhood model to compute, for each pixel, a color mean and spatial standard deviation.

At block 1006, the processor (e.g., the processor 406 of FIG. 4 executing the instructions of the super-resolution manager 420) accumulates color planes based on the super-resolution computations of block 1004. Accumulating the color plane may include the processor performing computations (e.g., mathematical relationship (1)) that, for each color channel, normalize pixel contributions (e.g., normalize contributions of each pixel, of the multiple image frames captured at block 1002, to each color channel).

At block 1008, the processor combines the accumulated color planes to create the super-resolution image of the scene. At block 1010, a display (e.g., the display 407 of FIG. 4) renders the super-resolution image of the scene.

Although the example method 1000 of FIG. 10 is described in the context of being performed by the camera system 400 of FIG. 4, operations within the example method 1000 (or portions of the operations) may be performed by one or more other devices having computational capabilities, such as a server or a cloud-computing device including instructions (or portions of instructions) of the super-resolution manager 422. For example, the image capture device 402 may capture the multiple frames of the image of the scene (e.g., block 1002) and transmit or share the multiple frames with a server or cloud-computing device. Such a server or cloud-computing device may perform the super-resolution computations (e.g., blocks 1004 and 1006), accumulate the color planes (e.g., block 1008) and transmit, back to the image capture system 400, the super-resolution image of the scene.

Figure 11:
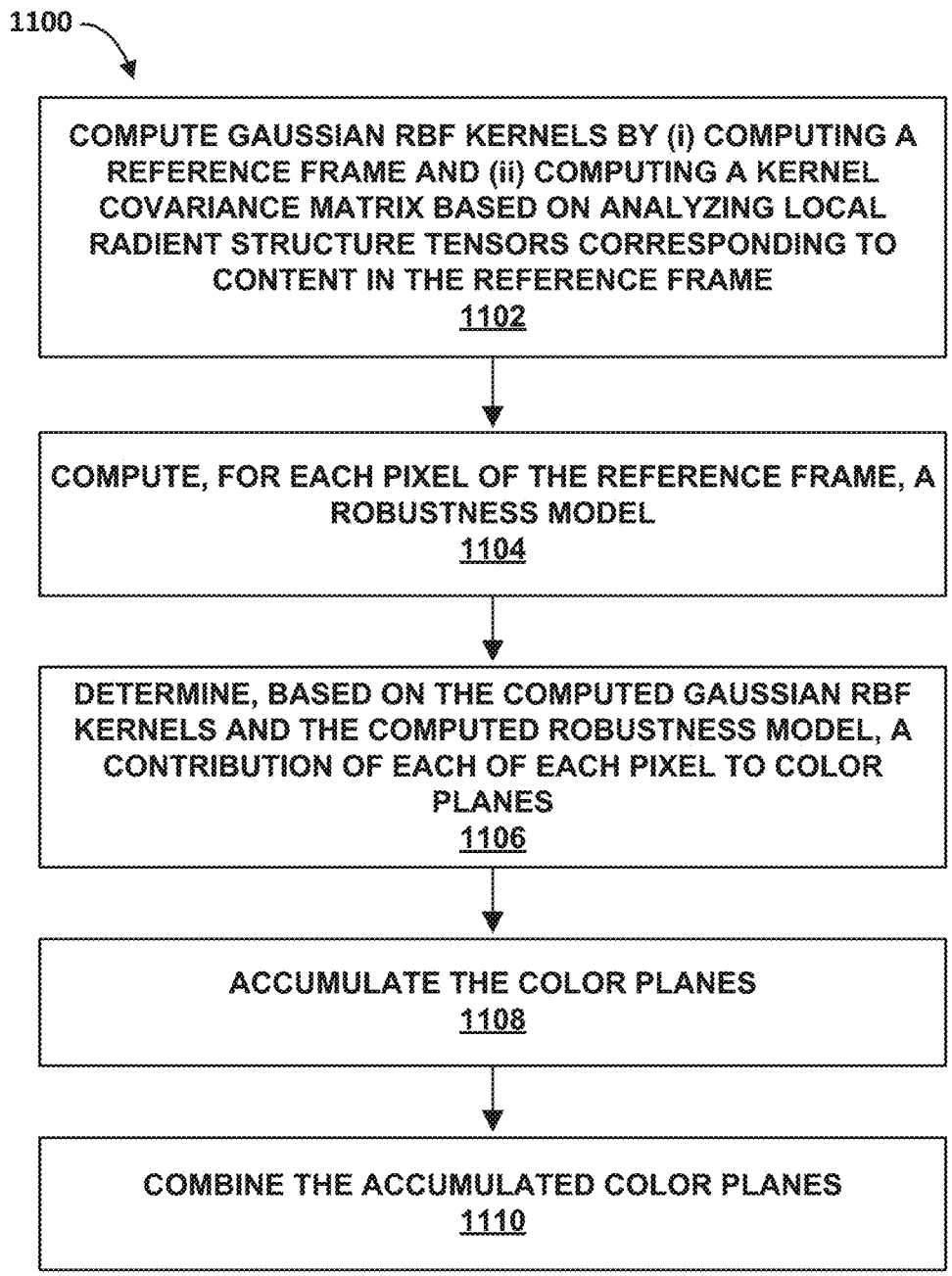
FIG. 11 illustrates a flow chart of a method used to accumulate color planes for a super-resolution image, according to an example implementation.

FIG. 11 illustrates example aspects of a method 1100 directed to combining color planes. The method 1100 represents an example method that may include one or more operations as depicted by one or more blocks 1102-1110, each of which may be carried out by any of the systems shown in FIGS. 1-4, among other possible systems. In an example implementation, a computing system or a sensor system (e.g., an image captured device, a sensor system 104, a control system 106, or camera system 400) performs the illustrated operations, although in other implementations, one or more other systems can perform some or all of the operations.

Those skilled in the art will understand that the flow charts described herein illustrates functionality and operations of certain implementations of the present disclosure. In this regard, each block of the flowcharts may represent a module, a segment, or a portion of program code, which includes one or more instructions executable by one or more processors for implementing specific logical functions or steps in the processes. The program code may be stored on any type of computer readable medium, for example, such as a storage device including a disk or hard drive.

In addition, each block may represent circuitry that is wired to perform the specific logical functions in the processes. Alternative implementations are included within the scope of the example implementations of the present application in which functions may be executed out of order from that shown or discussed, including substantially concurrent or in reverse order, depending on the functionality involved, as would be understood by those reasonably skilled in the art. Within examples, any system may cause another system to perform one or more of the operations (or portions of the operations) described below.

At block 1102, a processor or a computing system (e.g., the processor 406 executing the instructions of the super-resolution manager 420) computes Gaussian Radial Basis Function (RBF) kernels. Computing the Gaussian RBF kernels can include several aspects, including selecting a reference frame and computing a covariance matrix. Computing the kernel covariance matrix (e.g., mathematical relationship (1)) is based on analyzing local gradient structure tensors (e.g., mathematical relationship (2)), where the local gradient structure tensors correspond to edges, corners, or textured areas of content included in the reference frame.

In some instances, at block 1102, the multiple image frames of the image of the scene may have respective, relative sub-pixel offsets of the image across the multiple image frames due to a motion of an image capture device during the capture of the multiple image frames. Furthermore, and in some instances, the motion of the image capture device may correspond to a motion made by a vehicle including the image capture device. The motion, in some instances, may correspond to an acceleration or velocity of the vehicle.

At block 1104, the processor computes a robustness model. Computing the robustness model includes using a statistical neighborhood model to a color mean and a spatial standard deviation.

At block 1106, the processor determines color planes. The processor may determine, based on the computed Gaussian radial basis function kernel and the computed robustness model, a contribution of each pixel to the color planes.

At block 1108, the processor accumulates the color planes. Accumulating the color planes may include normalization computations (e.g., using mathematical relationship (1)).

At block 1110, the processor may provide the color planes to an apparatus that combines the color planes and rendering the color planes. For example, the color planes may be provided to a display (e.g., the display 407 of FIG. 4). The display may render the super-resolution image of the scene. In some instances, the color planes may be stored in a memory device (e.g., storage in a computer-readable media of the camera system 400 of FIG. 4).

Although the example method 1100 of FIG. 11 is described in the context of being performed by the camera system 400 of FIG. 4, operations within the example method 1100 (or portions of the operations) may be performed by one or more other devices having computational capabilities, such as a server or a cloud-computing device including instructions (or portions of instructions) of the super-resolution manager 422. For example, a server or cloud-computing device may perform the super-resolution computations (e.g., block 1102) and the accumulation of the color planes (e.g., block 1108).

Figure 12:
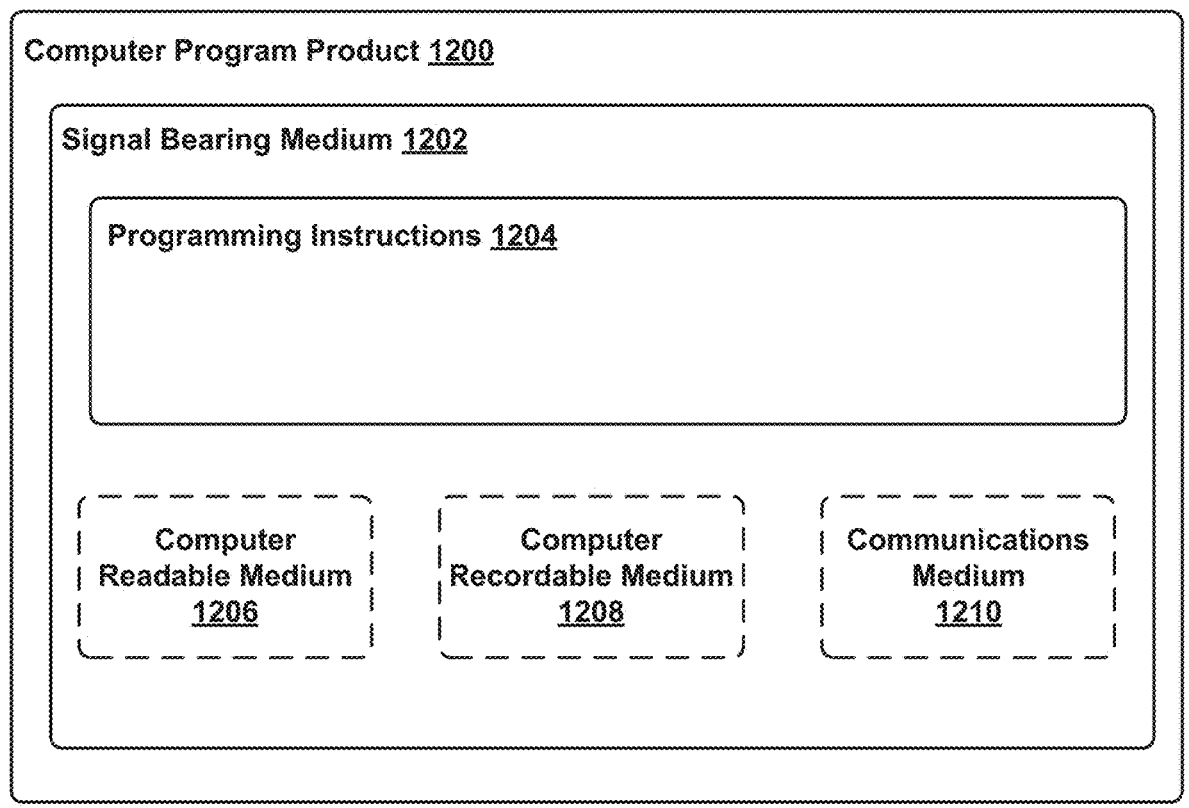
FIG. 12 is a schematic diagram of a computer program, according to an example implementation.

FIG. 12 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In an example implementation, computer program product 1200 is provided using signal bearing medium 1202, which may include one or more programming instructions 1204 that, when executed by one or more processors may provide functionality or portions of the functionality described above with respect to FIGS. 1-11. In some examples, the signal bearing medium 1202 may encompass a non-transitory computer-readable medium 1206, such as, but not limited to, a hard disk drive, a CD, a DVD, a digital tape, memory, components to store remotely (e.g., on the cloud) etc. In some implementations, the signal bearing medium 1202 may encompass a computer recordable medium 1608, such as, but not limited to, memory, read/write (R/W) CDs, R/W DVDs, etc. In some implementations, the signal bearing medium 1202 may encompass a communications medium 1210, such as, but not limited to, a digital and/or an analog communication medium (e.g., a fiber optic cable, a waveguide, a wired communications link, a wireless communication link, etc.). Similarly, the signal bearing medium 1202 may correspond to a remote storage (e.g., a cloud). A computing system may share information with the cloud, including sending or receiving information. For example, the computing system may receive additional information from the cloud to augment information obtained from sensors or another entity. Thus, for example, the signal bearing medium 1202 may be conveyed by a wireless form of the communications medium 1210.

The one or more programming instructions 1204 may be, for example, computer executable and/or logic implemented instructions. In some examples, a computing device such as the computer system 112 of FIG. 1, the remote computing system 302, the server computing systems of FIG. 3, and the image capture system 400 of FIG. 4 may be configured to provide various operations, functions, or actions in response to the programming instructions 1204 conveyed to the computing device by one or more of the computer readable medium 1206, the computer recordable medium 1208, and/or the communications medium 1210.

The non-transitory computer readable medium could also be distributed among multiple data storage elements and/or cloud (e.g., remotely), which could be remotely located from each other. The computing device that executes some or all of the stored instructions could be a vehicle, such as vehicle 200 illustrated in FIG. 2. Alternatively, the computing device that executes some or all of the stored instructions could be another computing device, such as a server.

Example methods, systems, and apparatus are described herein in accordance with one or more aspects associated with creating a super-resolution image of a scene. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-Specific Integrated Circuits (ASICs), Application-Specific Standard Products (ASSPs), System-on-a-Chip systems (SoCs), or Complex Programmable Logic Devices (CPLDs).

Further, the above detailed description describes various features and operations of the disclosed systems, apparatus, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims. For example, the variations to the systems and methods of super-resolution using motion of the image capture device, as described, are many. As a first example variation, super-resolution computations may generate (and accumulate) depth maps or other planes that are not associated with a specific color. As a second example variation, super-resolution computations may rely on sampling patterns that are other than Gaussian RBF sampling patterns. As a third example variation, super-resolution computations may rely on offsets corresponding to displacement fields instead of sub-pixel offsets. And, as a fourth example variation, super resolution-computations may rely on motion that is not induced vehicle movement (e.g., small motions of an image may generate necessary sub-pixel offsets or displacements to perform the super-resolution computations).

What is claimed is:

1. A method comprising:
causing, by a processor, a component of a vehicle to induce motion of an image capture device coupled to the vehicle;
capturing, by the image capture device, multiple image frames of an image of a scene in a burst sequence, the multiple image frames having respective, relative sub-pixel offsets of the image due to the induced motion of the image capture device during the burst sequence;
performing super-resolution computations using the captured multiple image frames;
creating, based on the super-resolution computations, a super-resolution image of the scene; and
controlling navigation of the vehicle based on at least the super-resolution image.

2. The method of claim 1, further comprising rendering the super-resolution image of the scene.

3. The method of claim 1, further comprising:
accumulating, based on the super-resolution computations, planes; and
combining the accumulated planes to create the super-resolution image of the scene.

4. The method of claim 1, wherein performing the super-resolution computations includes determining contributions of pixels of the multiple image frames of the image of the scene to planes.

5. The method of claim 1, wherein performing the super-resolution computations includes computing Gaussian radial basis function kernels.

6. The method of claim 5, wherein computing the Gaussian radial basis function kernels includes computing a kernel covariance matrix based on analyzing local gradient structure tensors of color-specific image planes aligned to a reference image frame.

7. The method of claim 6, wherein the local gradient structure tensors correspond to edges, corners, or textured areas of content included in a reference image frame.

8. The method of claim 5, wherein computing the Gaussian radial basis function kernels includes computing a kernel covariance matrix based on analyzing local gradient structure tensors, the local gradient structure tensors corresponding to edges, corners, or textured areas of content included in a reference image frame.

9. The method of claim 1, wherein performing the super-resolution computations includes computing a robustness model.

10. The method of claim 9, wherein computing the robustness model uses a statistical neighborhood model to compute a spatial color standard deviation or a mean difference.

11. The method of claim 9, wherein computing the robustness model includes using a statistical neighborhood model to compute a color mean and spatial standard deviation.

12. The method of claim 1, wherein performing the super-resolution computations includes filtering pixel signals from each of the multiple image frames to generate specific image planes for channels.

13. The method of claim 12, further comprising aligning color-specific image planes to a reference image frame.

14. The method of claim 12, wherein the respective channels include a red color channel, a blue color channel, and a green color channel.

15. An apparatus comprising:
one or more image sensors coupled to a vehicle;
at least one processor configured to:
cause a component of the vehicle to induce motion of the one or more image sensors;
capture, in a burst sequence using the one or more image sensors, multiple image frames of an image of a scene, the multiple image frames having respective, relative offsets of the image across the multiple image frames due to the induced motion of the one or more image sensors during the burst sequence;
perform super-resolution computations using the captured, multiple image frames of the image of the scene;
accumulate, based on the super-resolution computations, color planes;
combine, using the one or more processors, the accumulated color planes to create a super-resolution image of the scene; and
control navigation of the vehicle based on at least the super-resolution image.

16. The apparatus of claim 15, wherein the at least one processor performs the super-resolution computations using pipeline-processing.

17. The apparatus of claim 15, where the at least one processor is configured to:
accumulate, based on the super-resolution computations, color planes;
combine the accumulated color planes to create the super-resolution image of the scene; and
render the super-resolution image of the scene.

18. A non-transitory computer-readable medium storing instructions, the instructions being executable by one or more processors to perform functions comprising:
causing a component of a vehicle to induce motion of an image capture device coupled to the vehicle
capturing, by the image capture device, multiple image frames of an image of a scene in a burst sequence, the multiple image frames having respective, relative sub-pixel offsets of the image due to the induced motion of the image capture device during the burst sequence;
performing super-resolution computations using the captured multiple image frames;
creating, based on the super-resolution computations, a super-resolution image of the scene; and
controlling navigation of the vehicle based on at least the super-resolution image.

19. The method of claim 1, wherein the component of the vehicle comprises a subwoofer.

20. The method of claim 1, further comprising:
detecting a motion condition of the image capture device; and
determining whether to induce motion of the image capture device based on the detected motion condition of the image capture device.

* * * * *